(12) United States Patent
Sato et al.

(10) Patent No.: US 7,173,609 B2
(45) Date of Patent: Feb. 6, 2007

(54) IMAGE DISPLAY APPARATUS AND IMAGE DISPLAY METHOD

(75) Inventors: Ichiro Sato, Kyotanabe (JP); Katsuhiko Kumagawa, Neyagawa (JP); Kazuo Inoue, Hirakata (JP); Taro Funamoto, Ibaraki (JP); Wataru Machidori, Amagasaki (JP); Katsuyuki Arimoto, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 701 days.

(21) Appl. No.: 10/049,049

(22) PCT Filed: Jun. 8, 2001

(86) PCT No.: PCT/JP01/04866

§ 371 (c)(1),
(2), (4) Date: Feb. 7, 2002

(87) PCT Pub. No.: WO01/95023

PCT Pub. Date: Dec. 13, 2001

(65) Prior Publication Data

US 2002/0140691 A1  Oct. 3, 2002

(30) Foreign Application Priority Data

Jun. 8, 2000 (JP) ............................. 2000-172468
Oct. 4, 2000 (JP) ............................. 2000-304556

(51) Int. Cl.
*G09G 3/36* (2006.01)
(52) U.S. Cl. .......................... 345/204; 345/96
(58) Field of Classification Search ................ 345/204, 345/94, 96, 98

See application file for complete search history.

(56) References Cited

U.S. PATENT DOCUMENTS 6,421,039 B1 * 7/2002 Moon et al. ................. 345/100

(Continued)

FOREIGN PATENT DOCUMENTS

JP  3-251818  11/1991

(Continued)

OTHER PUBLICATIONS

Electrical Communication Association Papers, "Blur Injury by Motion on the Hold Type Picture Display", Yoshifumi Shimodaira et al., vol. 1, J68-B, No. 12 (Dec. 1985), pp. 1397-1404.

*Primary Examiner*—Jimmy H. Nguyen
(74) *Attorney, Agent, or Firm*—Wenderoth, Lind & Ponack, L.L.P.

(57) ABSTRACT

When displaying moving images by using liquid crystal panels and others, a problem exists in that tail streaks occur, and image degradation is resultantly caused. To solve this problem, an echo suppression circuit divides a video signal into a pair composed of two successive frames for comparison between these two frames in signal level for the purpose of suppressing an echo phenomenon occurring when a liquid crystal panel displays video signals including moving images. If these two frames are not the same in signal level, the signal is accordingly corrected so as to equalize the signal level of these frames. Based on the video signals and others corrected by the echo suppression circuit, a controller operates the liquid crystal panel with AC drive through a source driver and a gate driver. As such, the drive voltage used to operate the liquid crystal panel with AC drive is adjusted so as to be balanced between positive and negative. In this manner, the tail streaks are prevented when displaying moving images.

24 Claims, 38 Drawing Sheets

U.S. PATENT DOCUMENTS

| | | | |
|---|---|---|---|
| 6,424,330 B1* | 7/2002 | Johnson | 345/96 |
| 6,710,842 B2* | 3/2004 | Munakata et al. | 349/172 |
| 2004/0109103 A1* | 6/2004 | Ota et al. | 349/56 |

FOREIGN PATENT DOCUMENTS

| | | |
|---|---|---|
| JP | 5-341264 | 12/1993 |
| JP | 7-036058 | 2/1995 |
| JP | 7-175443 | 7/1995 |
| JP | 2701698 | 10/1997 |
| JP | 10-96893 | 4/1998 |
| JP | 11-272243 | 10/1999 |
| JP | 11-282431 | 10/1999 |
| KR | 1994-5074 | 3/1994 |
| KR | 1999-78257 | 10/1999 |

* cited by examiner

Fig. 3
(a)
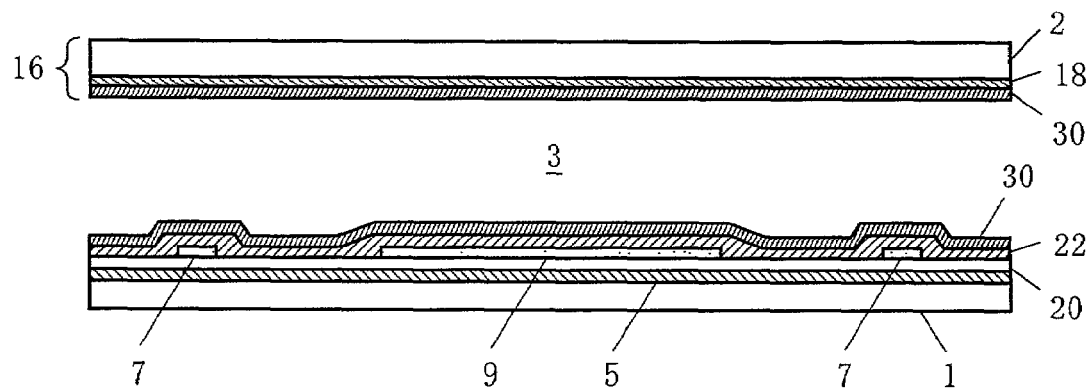
(b)
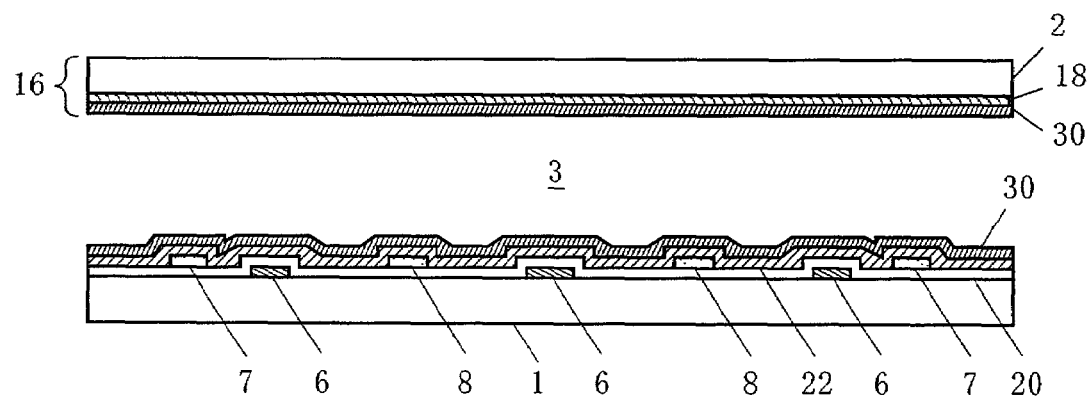
(c)
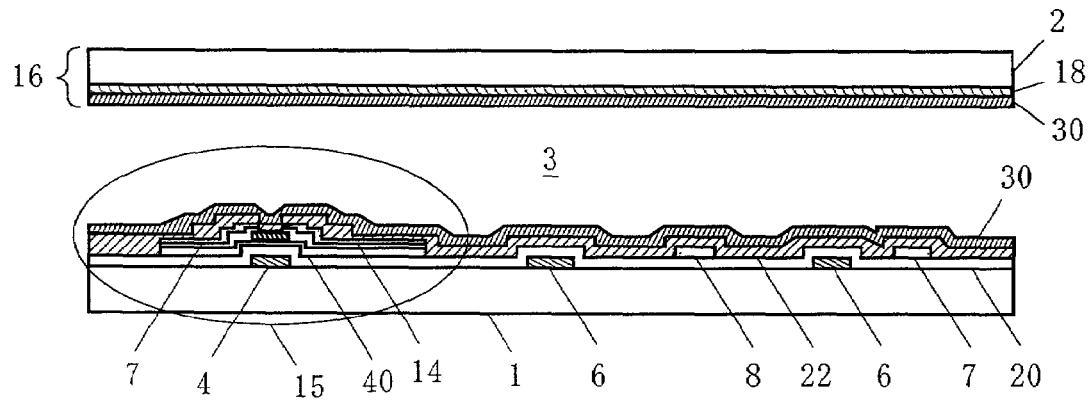

Fig. 19
(a)
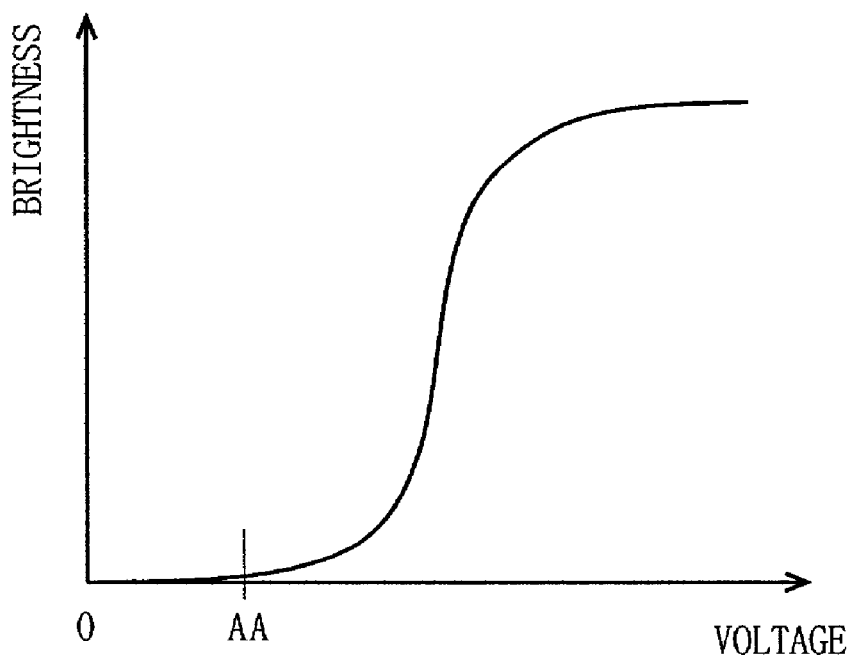
(b)
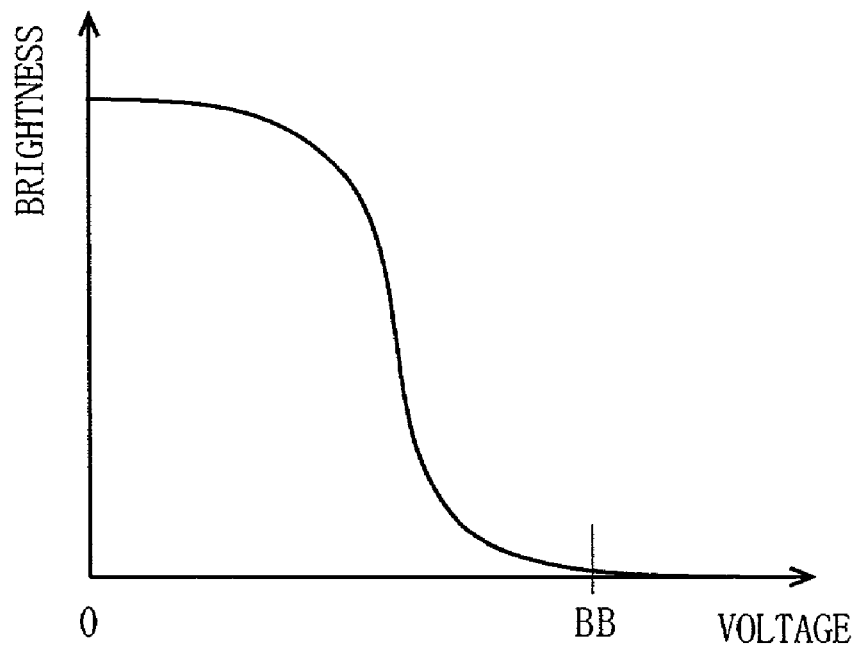

Fig. 27
(a)
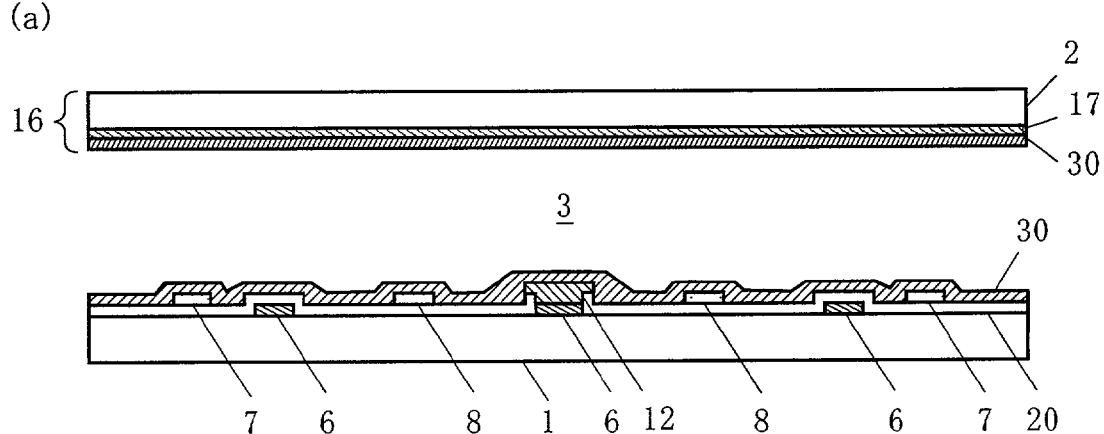
(b)
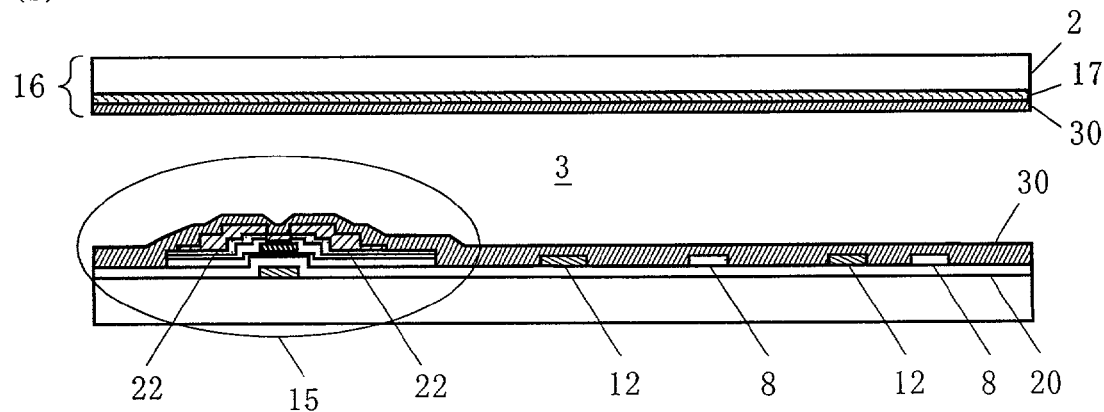

Fig. 29

| LIQUID CRYSTAL MATERIAL (% OF CONTENT OF CN LIQUID CRYSTAL) | ORIENTATION FILM | ADDITIVE OF IONIC COMPOUND | UV RAY IRRADIATION | HOLDING RATIO | ION DENSITY | ECHO PHENOMENON |
|---|---|---|---|---|---|---|
| CN0% | HIGH-RESISTANCE ORIENTATION FILM | NONE | NONE | 98% | $1 \times 10^{-13}$ | NO |
| CN1% | HIGH-RESISTANCE ORIENTATION FILM | NONE | NONE | 97% | $2 \times 10^{-13}$ | OBSERVABLE |
| CN5% | HIGH-RESISTANCE ORIENTATION FILM | NONE | NONE | 96% | $1 \times 10^{-12}$ | OBSERVABLE |
| CN10% | HIGH-RESISTANCE ORIENTATION FILM | NONE | NONE | 95% | $2 \times 10^{-12}$ | OBSERVABLE |
| CN20% | HIGH-RESISTANCE ORIENTATION FILM | NONE | NONE | 90% | $5 \times 10^{-12}$ | OBSERVABLE |
| CN0% | LOW-RESISTANCE ORIENTATION FILM | NONE | NONE | 95% | $1 \times 10^{-12}$ | OBSERVABLE |
| CN1% | LOW-RESISTANCE ORIENTATION FILM | NONE | NONE | 90% | $2 \times 10^{-12}$ | OBSERVABLE |
| CN0% | HIGH-RESISTANCE ORIENTATION FILM | NONE | 1000mJ | 95% | $5 \times 10^{-13}$ | OBSERVABLE |
| CN0% | HIGH-RESISTANCE ORIENTATION FILM | NONE | 2000mJ | 90% | $1 \times 10^{-12}$ | OBSERVABLE |
| CN0% | HIGH-RESISTANCE ORIENTATION FILM | 10ppm | NONE | 95% | $2 \times 10^{-13}$ | OBSERVABLE |
| CN0% | HIGH-RESISTANCE ORIENTATION FILM | 100ppm | NONE | 90% | $5 \times 10^{-13}$ | OBSERVABLE |

Fig. 30

| LIQUID CRYSTAL MATERIAL | ORIENTATION FILM | HOLDING RATIO | ION DENSITY | ECHO PHENOMENON |
|---|---|---|---|---|
| LIQUID CRYSTAL A | HIGH-RESISTANCE ORIENTATION FILM A | 98% | $1 \times 10^{-13}$ | NO |
| LIQUID CRYSTAL B | HIGH-RESISTANCE ORIENTATION FILM A | 98% | $1 \times 10^{-13}$ | NO |
| LIQUID CRYSTAL C | HIGH-RESISTANCE ORIENTATION FILM A | 99% | $0.9 \times 10^{-13}$ | NO |
| LIQUID CRYSTAL A | HIGH-RESISTANCE ORIENTATION FILM B | 98% | $1 \times 10^{-13}$ | NO |
| LIQUID CRYSTAL B | HIGH-RESISTANCE ORIENTATION FILM B | 99% | $9 \times 10^{-13}$ | NO |
| LIQUID CRYSTAL C | HIGH-RESISTANCE ORIENTATION FILM B | 99% | $1 \times 10^{-13}$ | NO |
| LIQUID CRYSTAL A | HIGH-RESISTANCE ORIENTATION FILM C | 98% | $1 \times 10^{-13}$ | NO |
| LIQUID CRYSTAL B | HIGH-RESISTANCE ORIENTATION FILM C | 98% | $1 \times 10^{-13}$ | NO |
| LIQUID CRYSTAL C | HIGH-RESISTANCE ORIENTATION FILM C | 98% | $1 \times 10^{-13}$ | NO |

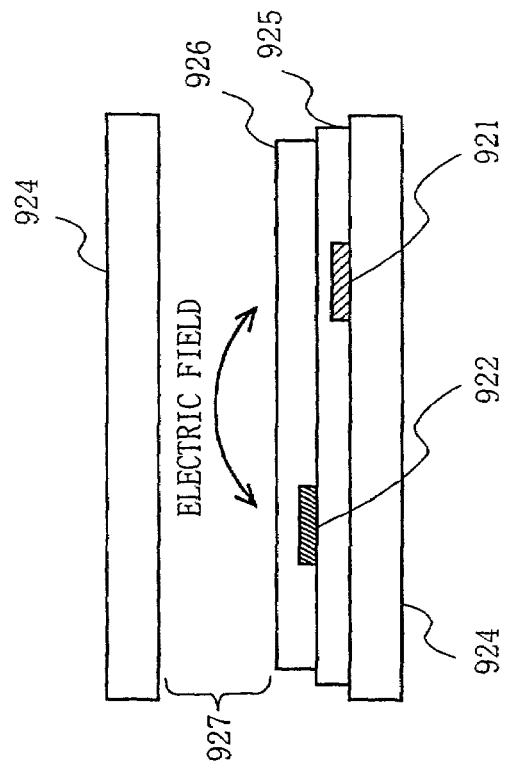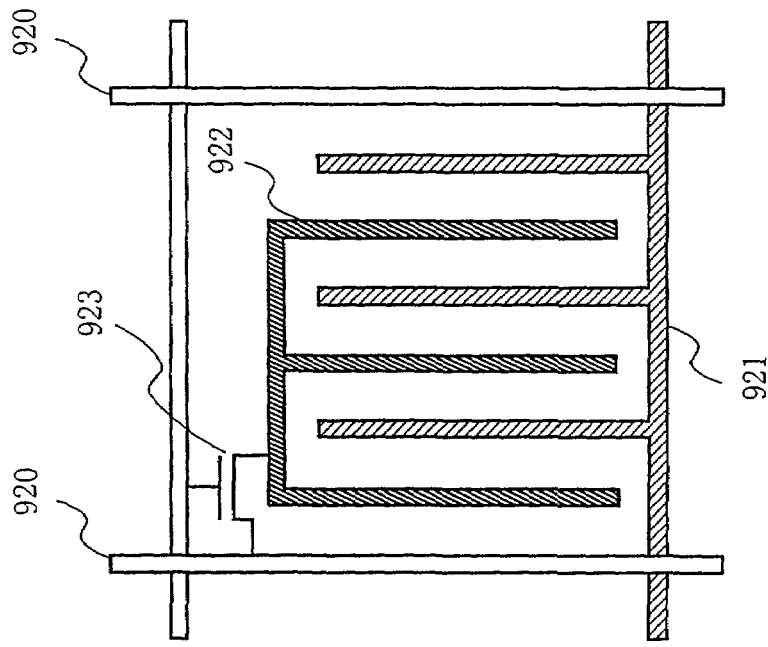
Fig. 33 (PRIOR ART)
(a) VIEW FROM DISPLAY PART
(b) SECTION VIEW

IMAGE DISPLAY APPARATUS AND IMAGE DISPLAY METHOD

TECHNICAL FIELD

The present invention relates to image display apparatuses and, more specifically, to image display apparatuses for displaying images based on input video signals. The present invention especially relates to image display apparatuses that are preferably applicable when displaying moving images on liquid crystal display apparatuses.

BACKGROUND ART

FIG. 31 is a block diagram showing the structure of a conventional liquid crystal display apparatus. In FIG. 31, the conventional liquid crystal display apparatus includes a controller 910, a source driver 911, a gate driver 912, and an IPS-type liquid crystal panel 913. The controller 910 performs, as a main role, timing control of the source driver 911 and the gate driver 912, and alternating-current (AC) drive control of the IPS-type liquid crystal panel 913.

The AC drive of the liquid crystal panel is described below. In the liquid crystal panel, a liquid crystal material is used to seal between two electrodes on a pixel basis so as to change the voltage to be applied between these electrodes. Thereby, liquid crystal molecules are aligned differently, the optical property is accordingly changed, and image display is thus performed. Generally, in a TN (Twisted Nematic)-type liquid crystal panel, if a direct-current (DC) is applied thereto as a driving voltage, ions in the liquid crystal material move closer to the electrodes, and as a result, a phenomenon called sticking-image occurs with some display images being stayed. This is the reason why the liquid crystal panel often operates with an AC drive, and is generally driven in AC waveforms in which the polarity alternates in synchronization with a vertical synchronizing signal of the video signal. FIG. 32 is a diagram showing a drive voltage waveform of, under such a conventional AC drive method, a test pattern of still images showing gray, white, and gray in the horizontal direction. The lateral axis is a space axis, that is, the lateral axis indicates pixel positions in the horizontal direction. Because of operation with an AC drive, the polarity of the drive waveform alternates on a frame basis, that is, between an odd-numbered frame and an even-numbered frame. Here, as shown in FIG. 32, the polarity of the drive waveform also alternates between any horizontally adjacent pixels, which is called dot reverse, or column reverse, and is one popular method which is used to reduce flicker often occurring at the time of the AC drive.

On the other hand, as a technique for improving the viewing angle performance of liquid crystal displays, liquid crystal panels of an in-plane switching type (hereinafter, referred to as IPS (in-Plane Switching) type) have been recently developed. FIG. 33 is a set of diagrams showing the structure of such an IPS-type liquid crystal panel. Specifically, FIG. 33(a) is a diagram viewed from a direction perpendicular to its display surface, while FIG. 33(b) shows a section view. As shown in FIG. 33, in the IPS-type liquid crystal panel, two electrodes for driving a liquid crystal, i.e., a common electrode 921 and a drain electrode 922, which is connected to a source line 920 through a pixel transistor 923, are in such a comblike structure as occluding each other on the same surface of a glass substrate 924. In the IPS-type liquid crystal panel, switching takes place with respect to the liquid crystal of a liquid crystal layer 927 by a horizontal electric field generated between these two electrodes 921 and 922, thereby advantageously realizing the property of quite a wide viewing angle. Here, because the liquid crystal is rather slow in response speed, the IPS-type liquid crystal panels are now mainly used as display panels for still images exemplified by monitors of personal computers. With the improvement of the IPS-type liquid panels and their relating technologies, the IPS-type liquid crystal panels are becoming applicable to displaying moving images such as television signals.

The issue here is, if a liquid crystal display apparatus including a conventional IPS-type liquid crystal panel displays moving images such as television signals, a problem surely arises due to liquid crystal being slow in response speed. Furthermore, the inventors have found another problem through their study in that movement of displaying objects, patterns, and others in the moving images result in tail streaks, which causes image degradation of the region to which those objects, patterns and others moved.

With reference to FIGS. 33 to 37, described in detail below is a mechanism why such a new problem of image degradation occurs if moving images are displayed on the IPS-type liquid crystal panel in the conventional liquid crystal display apparatus.

Initially, the electrode structure of the IPS-type liquid crystal panel is described first in comparison with that of the general TN-type liquid crystal panel.

Generally, in the TN-type liquid crystal panel, a planar transparent electrode (ITO) is provided for each glass substrate placed so as to face each other. With such a structure, the planar ITO works as a stopper when an insulator film over the ITO is removed in the manufacturing process, whereby etching can be done with no overetching being caused. In the IPS-type liquid crystal panel, on the other hand, as shown in FIG. 33, pixel electrodes are provided in a comblike structure (e.g., Al, Cr), that is, the common electrode 921 and the drain electrode 922 are placed so as to occlude each other on the same surface of the glass substrate. With such a structure, when insulator films over those pixel electrodes, that is, a gate insulator film 925 and a protection insulator film 926, are removed in the manufacturing process, electrodes such as the common electrode 921 and the drain electrode 922 work as a stopper for their own part, but there is nothing working as a stopper for a part between the common electrode 921 and the drain electrode 922. Thus, without correct control over the etching speed, there is a possibility for overetching. This is the reason why the insulator films over the pixel electrodes are often not removed in the IPS-type liquid crystal panel, that is, the pixel electrodes remain covered by the insulator films. This is one cause of the tail streaks mentioned above.

FIG. 34 is a set of diagrams showing drive voltage waveforms of the conventional liquid crystal display apparatus including the IPS-type liquid crystal panel in the case where a test pattern showing white, gray, and white is moved by two pixels rightward on a frame basis. In these diagrams each corresponding to a frame, the lateral axes indicate pixel positions in the horizontal direction (space axes), the vertical axes indicate the drive voltage, and the frames are arranged longitudinally in order (discrete time). As already described by referring to FIG. 32, with an AC drive, the polarity alternates on a frame basis in the drive voltage waveform, and further, with a column reverse, the polarity alternates on a pixel basis in the horizontal direction in the drive voltage waveform.

Here, in FIG. 34, focusing on a pixel A shown therein, a time-base representation of any change observed in the drive voltage will lead to a diagram shown in FIG. 35(a). As indicated by the thick line in FIG. 35(a), DC components (low frequency components) of the voltage applied to the electrodes become out of balance when the test pattern passes through. In other words, at the time when the test pattern passes through, the DC voltage is applied to the electrodes of the IPS-type liquid crystal panel.

As described in the foregoing, the electrodes of the IPS-type liquid crystal panel are each covered by an insulator film (SiNx), and therefore with a DC voltage being applied to the electrodes as such, polarization occurs in the insulator films. FIG. 36 is a model diagram showing how polarization occurs as a result of DC voltage application, (−) to the common electrode 921, and (+) to the drain electrode 922. As shown in FIG. 36, DC voltage application to the IPS-type liquid crystal panel causes ions in its liquid crystal layer to move, and due to a resultant uneven distribution of ions, polarization occurs both in the liquid crystal layer and the insulator films covering the electrodes. As a result of such polarization, electric field components are generated so that the electric field applied to the liquid crystal layer is thereby cancelled out. Moreover, the electric field components generated as such keep affecting the electric field applied to the liquid crystal for the duration until the polarization level is lowered.

FIG. 35(b) is a diagram showing an electric field applied to the liquid crystal of the focusing pixel A. As indicated by the thick line in FIG. 35(b), due to polarization resulting from an electrode voltage added with DC components, such an electric field component as canceling out the DC components affects an electric field to be applied to the liquid crystal during a pattern display period and thereafter. Here, focusing on the electric field especially after the pattern has passed through, in frames after the pattern has passed through, the voltage to be originally applied to the liquid crystal of the pixel A is the one showing no change in absolute value as shown in FIG. 35(a). However, as shown in FIG. 35(b), actually applied thereto is such a voltage as increasing and decreasing in absolute value on a frame basis. As a result, AC drive becomes out of balance between positive and negative, causing flicker. As described above, under AC drive, the polarity alternates in synchronization with the vertical synchronizing signal. Accordingly, such flicker occurs in half of the frequency components of the vertical synchronizing signal.

Such flicker increases in proportion to the size of the DC component and the time when the DC component was applied. As an example, by first displaying white for a positive frame and black for a negative frame sequentially for two seconds each, and then displaying gray, a flicker resultantly occurs which is visible even to the naked eye. Also, even if the flicker that has occurred is in such a level as not being visible to the naked eye when the line of sight is fixed, the flicker may become visible once the line of sight is changed. This is explainable by the human eyes as being a sensory organ sensitive to the amount of spatial and temporal changes. When the line of sight is fixed, only the amount of temporal change in brightness becomes a sensory stimulation, but when the line of sight is changed, in addition to the amount of temporal change in brightness, the amount of spatial change in brightness also becomes the sensory stimulation. For example, as shown in FIG. 37, in a display screen 914 of the IPS-type liquid crystal panel, if an exemplary test pattern of a white BOX 915 is moved leftward within a gray background 916, the human eyes follow this movement. Since synchronization is established between the movement of the test pattern and flicker, as indicated by the arrows in FIG. 38, the line of sight has a directional property in the temporal and spatial direction, and as a result, flicker occurs as if a pattern of streaks is moving. As a result, a tail echo 917 such as the one shown in FIG. 37 is perceived. As such, unlike general afterglow, the tail echo 917 appears as a pattern of streaks, causing considerable image degradation of the moving images.

Here, as described in the foregoing, one cause of the tail echo 917 is an uneven distribution of ions (liquid crystal polarization) as a result of DC voltage application. This polarization occurs as a result of impurity ions in the liquid crystal panel moving in response to the electric field. Accordingly, the polarization level is increased as the density of such impurity ions is increased in the liquid crystal panel.

Conventionally, in order to increase the response speed of a liquid crystal material used for the IPS system, its viscosity has been on a downward path. Further, in order to lower the drive voltage, $\Delta\in$ (anisotropic dielectric constant) has been on an upward path. Through such a development, the liquid crystal material for the IPS system generally includes a CN liquid crystal, or the liquid crystal material to be used therefor is high in $\in$ (permittivity). However, with such a liquid crystal material including a CN liquid crystal or being high in $\in$, impurity ions are to be easily captured in the liquid crystal. As a result, as already described, polarization occurs easily so that an electrical charge on the resultant interface is increased.

Moreover, for the purpose of reducing a streaking-image, for example, the liquid crystal panel may be filled with liquid crystal of a low resistance or provided with an orientation film, the liquid crystal panel may be irradiated with a UV ray, or the liquid crystal therein may be mixed with any additive. If these are the cases, however, the ion density in the liquid crystal is resultantly increased so that the above-described echo phenomenon occurs more apparently, considerably degrading the quality of the moving images.

Therefore, an object of the present invention is to provide a liquid crystal display apparatus and method in which no echo phenomenon occurs even if moving images are displayed by using a liquid crystal panel.

SUMMARY OF THE INVENTION

To achieve the above object, the present invention has the following aspects.

A first aspect of the present invention is directed to an image display apparatus for displaying an image based on an input video signal. The image display apparatus comprises: a display device for outputting image lights according to a voltage to be applied; drive means (unit) for driving the display device by switching a drive voltage applied across a pixel liquid crystal between positive and negative for application based on the input video signal; and means (suppression unit) for suppressing a polarization phenomenon in the display device.

As described above, in the first aspect, the echo phenomenon occurring when moving images are displayed can be suppressed by preventing the polarization phenomenon in the display device.

According to a second aspect, in accordance with the first aspect, the means for suppressing the polarization phenomenon is an adjustment means for adjusting the drive voltage by correcting the input video signal or the drive voltage so that absolute values of the drive voltage between positive and negative in at least any two successive frames become closer.

As described above, in the second aspect, the drive voltage can be better balanced between positive and negative by adjusting absolute values of the positive and negative drive voltages to be closer. As a result, ions are not easily distributed unevenly and polarization hardly occurs in the insulator film, thereby suppressing the echo phenomenon.

According to a third aspect, in accordance with the second aspect, when an absolute value of the drive voltage in an n-th frame of a signal being normal to the input video signal is different from an absolute value of the drive voltage in an n+1-th frame or in an n−1-th frame, the adjustment means adjusts the drive voltage of any one of the n+1-th frame, the n−1-th frame, or the n-th frame.

As described above, in the third aspect, since the drive voltage is adjusted by referring to both a preceding frame and a subsequent frame, adjustment of the drive voltage can be done more optimally.

According to a fourth aspect, in accordance with the third aspect, the adjustment means adjusts the drive voltage of both the n+1-th frame and the n−1-th frame.

As described above, in the fourth aspect, both of the preceding frame and the subsequent frame are subjected to drive voltage adjustment. Therefore, such adjustment can be done more optimally depending on the video signal, and as a result, the resultantly corrected moving images look smoother.

According to a fifth aspect, in accordance with the third aspect, when adjusting the drive voltage, the adjustment means holds a maximum value or a minimum value.

As described above, in the fifth aspect, by leaving the maximum value or the minimum value as it is without correcting the same, the original video signal can retain its contrast.

According to a sixth aspect, in accordance with the third aspect, when adjusting the drive voltage, the adjusting means holds a sum of the absolute values or a square sum of the absolute values of the n+1-th frame, the n−1-th frame, and the n-th frame.

As described above, in the sixth aspect, by equalizing, in terms of time, average values of the absolute values of the drive voltage before and after correction, correction can be done with little influence, and the resultant images look smoother.

According to a seventh aspect, in accordance with the second aspect, if the polarity of the drive voltage applied to the two successive frames is different from each other, the adjustment means adjusts the drive voltage to make a difference of the absolute values of the drive voltage to be ½ of a maximum drive voltage or smaller.

As described above, in the seventh aspect, the drive voltage is corrected so as to be in balance between positive and negative, whereby echo phenomenon can be restrained to a greater degree.

According to an eighth aspect, in accordance with the seventh aspect, the adjustment means adjusts the drive voltage to make the difference of the absolute values of the drive voltage to be ⅒ of the maximum drive voltage or smaller.

As described above, in the eighth aspect, the drive voltage is corrected so as to be in much better balance between positive and negative, and thus, the echo phenomenon can be suppressed to such a level as not to be perceivable by the naked eye.

According to a ninth aspect, in accordance with the eighth aspect, the adjustment means adjusts the drive voltage when, prior to adjustment, the difference of the absolute values of the drive voltage exceeds ⅒ of the maximum drive voltage.

As described above, in the ninth aspect, the drive voltage can be corrected only when the echo phenomenon is to be observed by the naked eye.

According to a tenth aspect, in accordance with the first aspect, the drive means divides one vertical scanning period of the input video signal into a first sub period and a second sub period, and the drive voltage applied to the sub periods is different in polarity.

As described above, in the tenth aspect, by adjustably balancing the drive voltage between positive and negative on the basis of a vertical scanning period, the echo phenomenon can be restrained.

According to an eleventh aspect, in accordance with the tenth aspect, the drive means outputs the same video signal in the first sub period and the second sub period.

As described above, in the eleventh aspect, the drive voltage can be adjusted only by switching the polarity of the drive voltage between the first sub period and the second sub period. Therefore, the structure can be simplified.

According to a twelfth aspect, in accordance with the tenth aspect, the first sub period and the second sub period are the same in length.

As described above, in the twelfth aspect, the drive voltage can be adjusted only by simply increasing the signal speed. Therefore, the structure can be simplified.

According to a thirteenth aspect, in accordance with the tenth aspect, the first sub period and the second sub period are not the same in length.

As described above, in the thirteenth aspect, adjustment of the drive voltage can become possible by considering the speed of the ions moving in the liquid crystal, for example.

According to a fourteenth aspect, in accordance with the tenth aspect, the drive means (unit) includes division means for dividing the one vertical scanning period of the input video signal into the first sub period and the second sub period.

As described above, in the fourteenth aspect, each vertical scanning period of the input video signal can be divided, for output, into the first sub period and the second sub period. Therefore, the drive voltage can be adjusted only by switching the polarity of these signals.

According to a fifteenth aspect, in accordance with the fourteenth aspect, the division means includes means for temporarily storing the input video signal.

As described above, in the fifteenth aspect, even with high-speed drive, the reliability will not be lowered through division.

According to a sixteenth aspect, in accordance with the fourteenth aspect, the division means includes means for delaying the input video signal by a length of time equal to or shorter than the one vertical scanning period.

As described above, in the sixteenth aspect, the division means can be realized at lower cost.

According to a seventeenth aspect, in accordance with the fourteenth aspect, conversion means (unit) is further comprised for converting the input video signal into a data display signal for driving the display device, wherein in a process for converting the input video signal into the data display signal, the conversion means divides the one vertical scanning period of the input video signal into the first sub period and the second sub period.

As described above, in the seventeenth aspect, the number of required constituents can be reduced, and thus, the liquid crystal display apparatus can be realized at relatively low cost.

According to an eighteenth aspect, in accordance with the first aspect, the drive means divides one vertical scanning period of the input video signal into a first sub period and a second sub period, outputs the input video signal in the first sub period, and outputs a compensation signal in the second sub period.

As described above, in the eighteenth aspect, a compensation signal which is irrelevant to the input video signal which affects image display not that much is inserted to each vertical scanning period. In this manner, uneven ion distribution is eased, and the echo phenomenon can be restrained.

According to a nineteenth aspect, in accordance with the eighteenth aspect, he second sub period is shorter than the first sub period.

As described above, in the nineteenth aspect, the screen can be prevented from being lowered in brightness due to the compensation signal being inserted thereto.

According to a twentieth aspect, in accordance with the eighteenth aspect, the drive voltage in the second sub period is a voltage of a pedestal level or lower when the display device is a normally black type, and the drive voltage is a voltage of the pedestal level or higher when the display device is a normally white type.

As described above, in the twentieth aspect, uneven ion distribution can be cancelled sooner without, nearly, affecting image display, whereby resultant effects by such improvement can be enhanced.

According to a twenty-first aspect, in accordance with the twentieth aspect, the display device is a normally black type, and the drive voltage in the second sub period is 0V.

As described above, in the twenty-first aspect, uneven ion distribution can be cancelled sooner without, nearly, affecting image display, whereby resultant effects by such improvement can be enhanced.

According to a twenty-second aspect, in accordance with the eighteenth aspect, the drive voltage in the second sub period is applied to a plurality of scanning lines at one time.

As described above, in the twenty-second aspect, the time that is taken for scanning can be shortened by reducing the scanning time that is taken for writing of the compensation signal.

According to a twenty-third aspect, in accordance with the first aspect, the drive means scans, in an n-th frame, odd-numbered scanning lines for a data signal and even-numbered scanning lines for a compensation signal, and scans, in an n+1-th frame, the odd-numbered scanning lines for the compensation signal, and the even-numbered lines for the data signal.

As described above, in the twenty-third aspect, by inserting a compensation signal to all of the pixels on a frame basis, uneven ion distribution can be eased, and the echo phenomenon can be suppressed. Further, the timing for displaying the compensation signal may be shifted by one frame depending on whether the scanning line is odd-numbered or even-numbered. This prevents the screen from getting blackened in its entirely for every other frame due to the compensation signal, for example. Moreover, when the video signal is an interlace signal, there is no need to convert it to a progressive signal. Therefore, the image display apparatus can be realized at relatively low cost.

According to a twenty-fourth aspect, in accordance with the first aspect, during one vertical scanning period of the input video signal, after sequentially scanning either one of odd-numbered scanning lines and even-numbered scanning lines, the drive means sequentially scans the scanning line.

As described above, in the twenty-fourth aspect, since a periodical change in brightness which is a cause of the echo phenomenon is shifted by a half period for any adjacent scanning lines, the echo phenomenon does not become perceivable.

According to a twenty-fifth aspect, in accordance with the first aspect, the drive means applies the drive voltage of the same polarity without polarity reverse to at least any two successive frames.

As described above, in the twenty-fifth aspect, the drive voltage is corrected to be in better balance between positive and negative, and thus, the echo phenomenon can be restrained.

According to a twenty-sixth aspect, in accordance with the twenty-fifth aspect, the drive means applies such a drive voltage that alternates the polarity for every two frames.

As described above, in the twenty-sixth aspect, the drive voltage is corrected to be in better balance between positive and negative, and thus, the echo phenomenon can be restrained.

According to a twenty-seventh aspect, in accordance with the twenty-fifth aspect, the drive means applies the drive voltage of the same polarity between any two successive frames once for every n frames.

As described above, in the twenty-seventh aspect, the drive voltage is corrected to be in better balance between positive and negative, and thus, the echo phenomenon can be restrained.

According to a twenty-eighth aspect, in accordance with the first aspect, the display device includes liquid crystal, and an orientation film, where a combination of the liquid crystal and the orientation film is a combination to make a voltage holding ratio 98% or higher.

As described above, in the twenty-eighth aspect, the echo phenomenon can be prevented from occurring.

According to a twenty-ninth aspect, in accordance with the first aspect, the display device includes liquid crystal, and an orientation film, where as the means for suppressing the polarity phenomenon, the liquid crystal includes 1wt % or less of a CN (cyano group) compound, and the orientation film does not include a high polymer whose conjugated length is seven atoms or more.

As described above, in the twenty-ninth aspect, the echo phenomenon can be prevented from occurring.

According to a thirtieth aspect, in accordance with the first aspect, the display device includes liquid crystal, an orientation film, and a pixel electrode and a common electrode for applying the voltage to the liquid crystal, where at least a part of the pixel electrode and the common electrode applies the voltage to the liquid crystal only via the orientation film.

As described above, in the thirtieth aspect, electric charge which is the cause of the echo phenomenon becomes easily absorbed into the electrode. Accordingly, the echo phenomenon can be prevented from occurring.

According to a thirty-first aspect, in any one of the first to thirtieth aspects, the display device includes liquid crystal, and an electrode for applying the voltage to the liquid crystal, where a part of the liquid crystal is driven in a state that there is none of the electrode in the vicinity thereof.

As described above, in the thirty-first aspect, if the liquid crystal has any region including no electrode in the vicinity as in the region between electrodes in the IPS-type liquid crystal panel, for example, electric charge which is a cause of the echo phenomenon may stay without being absorbed into the electrodes. Even if these display devices are to be used, the echo phenomenon can be successfully suppressed.

According to a thirty-second aspect, in accordance with any one of the first to thirtieth aspects, the display device includes liquid crystal, and a pixel electrode and a common electrode for applying the voltage to the liquid crystal, where the liquid crystal is driven by an electric field which is generated between the pixel electrode and the common electrode, and is almost parallel to a substrate.

As described above, in the thirty-second aspect, the echo phenomenon can be successfully suppressed even with the IPS-type liquid crystal panel in which electric charge which is a cause of the echo phenomenon may stay without being absorbed into the electrodes.

According to a thirty-third aspect, in accordance with any one of the first to twenty-seventh aspects, the display device is made of a plurality of materials, where at least one of the materials is a material with which an echo phenomenon easily occurs.

As described above, in the thirty-third aspect, the echo phenomenon can be successfully suppressed even with the display device being made of a material with which the echo phenomenon easily occurs.

A thirty-fourth aspect is directed to an image display method for displaying an image by driving a display device based on an input video signal. The image display method of the thirty-fourth aspect comprises: a drive step of driving the display device by switching a drive voltage between positive and negative for application based on the input video signal; and an adjusting step of adjusting the drive voltage by correcting the input video signal or the drive voltage so that absolute values of the drive voltage between positive and negative become closer in at least any two successive frames.

As described above, in the thirty-fourth aspect, the drive voltage can be better balanced between positive and negative by adjusting absolute values of the positive and negative drive voltages to be closer. As a result, ions are not easily distributed unevenly and polarization hardly occurs in the insulator film, thereby suppressing the echo phenomenon.

A thirty-fifth aspect is directed to an image display method for displaying an image by driving a display device based on an input video signal. The image display method of the thirty-fifth aspect comprises a drive step of driving the display device by switching a drive voltage between positive and negative for application based on the input video signal. The drive step divides one vertical scanning period of the input video signal into a first sub period and a second sub period, and the drive voltage applied to the sub periods is different in polarity.

As described above, in the thirty-fifth aspect, by adjustably balancing the drive voltage between positive and negative on the basis of a vertical scanning period, the echo phenomenon can be restrained.

A thirty-sixth aspect is directed to an image display method for displaying an image by driving a display device based on an input video signal. The image display method of the thirty-sixth aspect comprises a drive step of driving the display device by switching a drive voltage between positive and negative for application based on the input video signal. The drive step divides one vertical scanning period of the input video signal into a first sub period and a second sub period, and outputs the input video signal in the first sub period, outputs a compensation signal in the second sub period.

As described above, in the thirty-sixth aspect, a compensation signal which is irrelevant to the input video signal and which does not affect image display that much is inserted to each vertical scanning period. In this manner, uneven ion distribution is eased, and the echo phenomenon can be restrained. A thirty-seventh aspect is directed to an image display method for displaying an image by driving a display device based on an input video signal. The image display method of the thirty-seventh aspect comprises a drive step of driving the display device by switching a drive voltage between positive and negative for application based on the input video signal. The drive step scans, in an n-th frame, odd-numbered scanning lines for a data signal and even-numbered scanning lines for a compensation signal, and scans, in an n+1-th frame, the odd-numbered scanning lines for the compensation signal and the even-numbered lines for the data signal.

As described above, in the thirty-seventh aspect, by inserting a compensation signal to all of the pixels on a frame basis, uneven ion distribution can be eased, and the echo phenomenon can be suppressed. Further, the timing for displaying the compensation signal maybe shifted by one frame depending on whether the scanning line is odd-numbered or even-numbered. This prevents the screen from getting blackened in its entirety for every other frame due to the compensation signal, for example. Moreover, when the video signal is an interlace signal, there is no need to convert it to a progressive signal. Therefore, the image display apparatus can be realized at relatively low cost.

A thirty-eighth aspect is directed to an image display method for displaying an image by driving a display device based on an input video signal. The image display method of the thirty-eighth aspect comprises a drive step of driving the display device by switching a drive voltage between positive and negative for application based on the input video signal. During one vertical scanning period of the input video signal, after sequentially scanning either one of the odd-numbered scanning lines and the even-numbered scanning lines, the drive step sequentially scans the scanning line.

As described above, in the thirty-eighth aspect, since a periodical change in brightness which is a cause of the echo phenomenon is shifted by a half period for any adjacent scanning lines, the echo phenomenon does not become perceivable.

A thirty-ninth aspect is directed to an image display method for displaying an image by driving a display device based on an input video signal. The image display method of the thirty-ninth aspect comprises a drive step of driving the display device by switching a drive voltage between positive and negative for application based on the input video signal. The drive step applies the drive voltage of the same polarity without polarity reverse to at least any two successive frames.

As described above, in the thirty-ninth aspect, the drive voltage is corrected to be in better balance between positive and negative, and thus the echo phenomenon can be restrained.

BRIEF DESCRIPTION OF THE DRAWINGS

FIG. 3 are section views of the structure of the liquid crystal panel 108.

FIGS. 19(a) and (b) are diagrams showing the relationship between brightness and voltage in a liquid crystal panel in an NB mode or an NW mode.

FIGS. 27(a) and (b) are section views of the liquid crystal panel of the tenth embodiment.

FIG. 29 is a diagram showing whether the echo phenomenon occurs under what condition.

FIG. 30 is a diagram showing whether or not the echo phenomenon occurs in the liquid crystal panel varying in structure according to an eleventh embodiment of the present invention.

FIGS. 33(a) and (b) are diagrams showing the electrode structure of an IPS-type liquid crystal panel.

DETAILED DESCRIPTION OF THE INVENTION

Various embodiments of the present invention are described below by referring to the accompanying drawings.

First Embodiment

Figure 1:
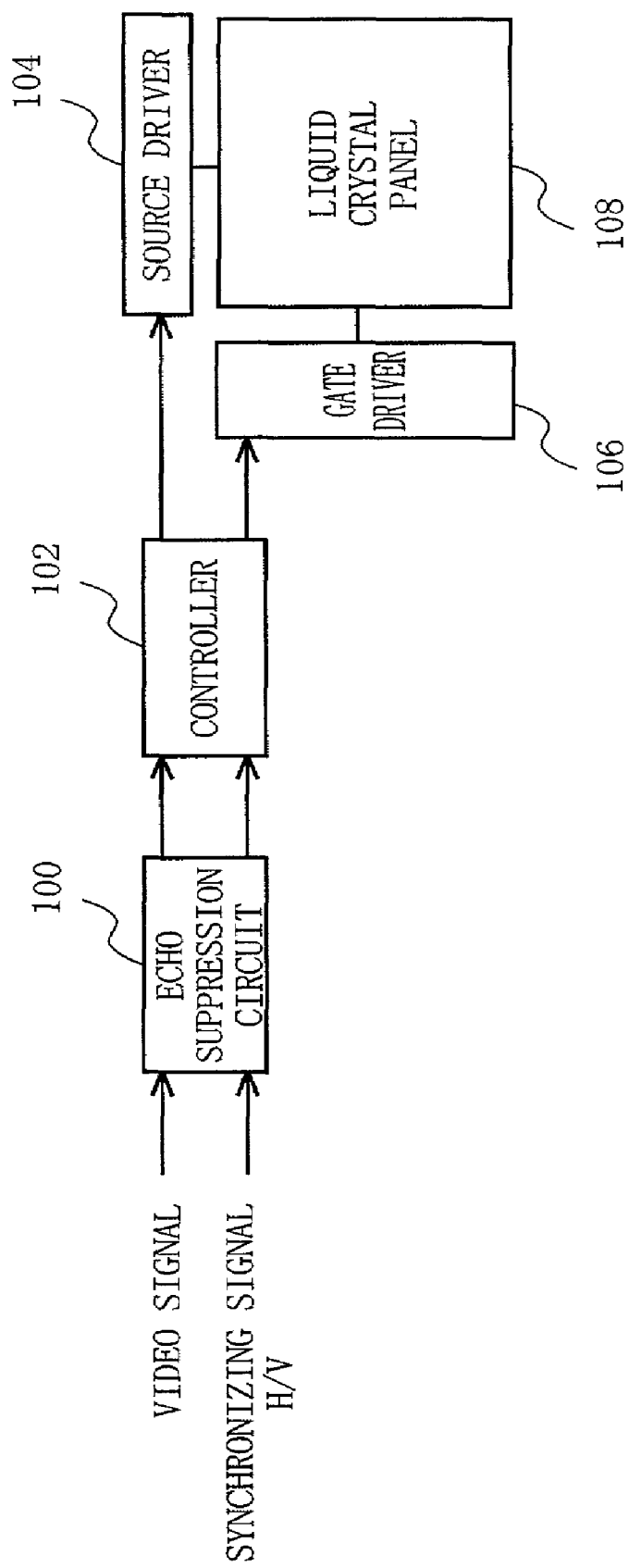
FIG. 1 is a block diagram showing the structure of a liquid crystal display apparatus according to a first embodiment of the present invention.

In a first embodiment of the present invention, the above-described echo phenomenon is prevented by correcting absolute values of a drive voltage with which a liquid crystal panel is operated under AC drive, whereby the drive voltage is adjusted so as to balance between positive and negative. FIG. 1 shows the structure of a liquid crystal display apparatus according to the first embodiment of the present invention. The liquid crystal display apparatus includes an echo suppression circuit 100, a controller 102, a source driver 104, a gate driver 106, and a liquid crystal panel 108.

Figure 2:
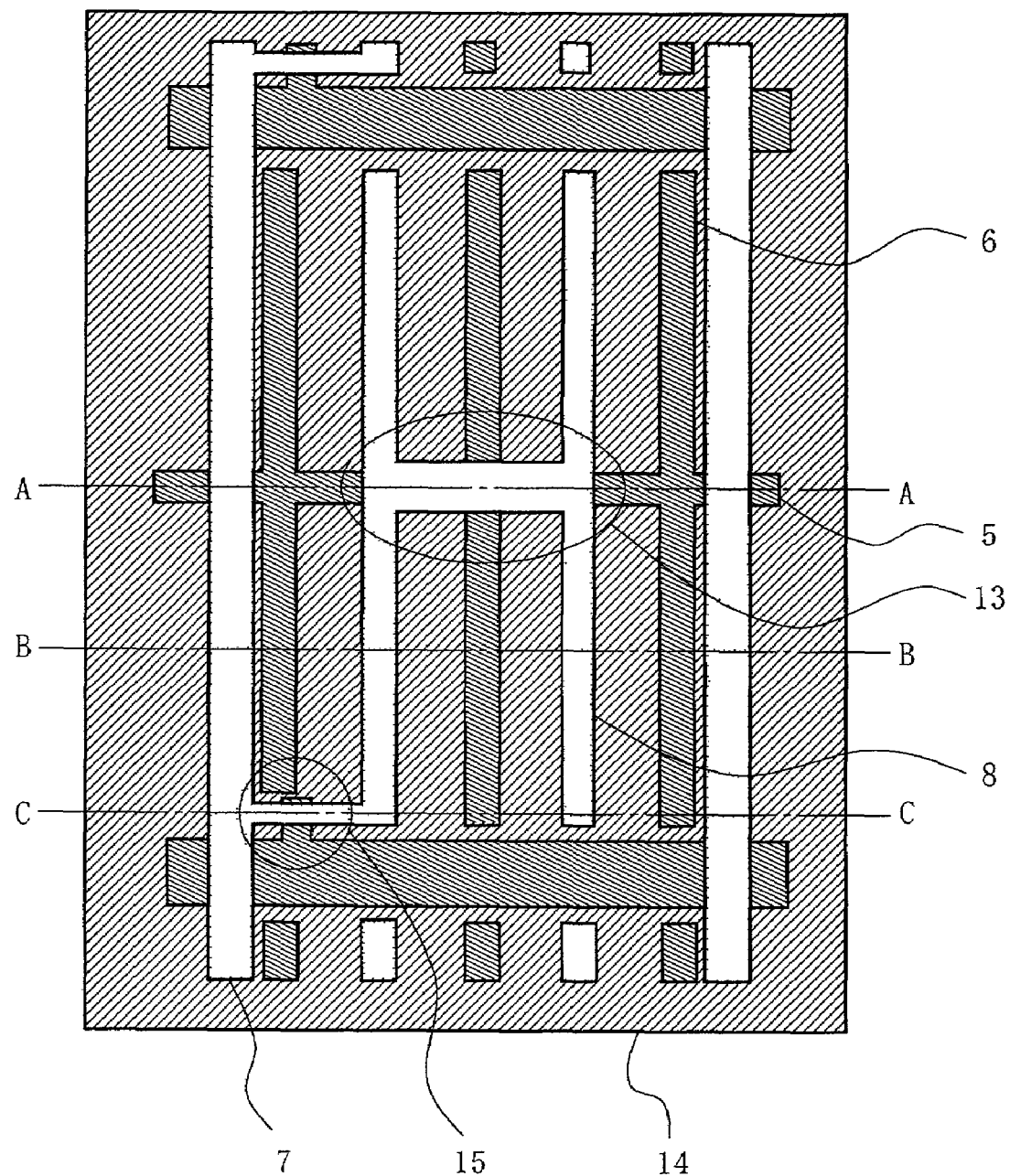
FIG. 2 is a top view of the structure of a liquid crystal panel 108.

FIG. 2, and FIG. 3(a) to FIG. 3(c) show the structure of the liquid crystal panel 108. FIG. 2 is a top view of a unit pixel part of the liquid crystal panel 108. FIG. 3(a) to FIG. 3(c) show, respectively, a section view along A—A of FIG. 2, a section view along B—B, and a section view along C—C. The structure of the liquid crystal panel 108 is described below by referring to these drawings. Here, the liquid crystal panel 108 is a general type as an IPS-type liquid crystal panel.

On a glass substrate 1, as metal leads, a video signal line (source line) 7 and a scanning signal line (gate line) 4 are placed in a matrix, and at each intersection point thereon, a TFT (Thin Film Transistor) is formed as a switching element. On the glass substrate 1, a gate electrode 4 and common electrodes 5 and 6 made of metal such as Al are formed simultaneously. In the case where the gate electrode 4 and the common electrodes 5 and 6 are made of Al, the displaying area is entirely subjected to an anodic oxidation process so as to effectively prevent shorts between layers at a part where leads are intersected. Next, a first insulator film 20 (interlayer insulator film) is formed, and then a semiconductor film (amorphous silicon layer) 40 and a protection layer of the transistor are sequentially formed.

Then, a contact hole having the first insulator film removed therefrom is formed in a part not including the display part but being in the vicinity thereof. As a result, contact with the lead part to be formed next becomes possible. Next, by using metal such as Al and Ti, the signal lead (source line) 7, a drain line 14, and pixel electrodes 8 and 9 are formed. In order to protect the TFT formed as described above, a second insulator film (passivation film) 22 is formed by using SiNx. The second insulator film 22 is formed so as to cover a pixel part in its entirety. As to another part except for the display part, the second insulator film is removed therefrom for such a reason that a terminal part is located there for application of electrical signals.

The resultant array substrate and a color filter substrate 16 are both provided with an orientation film 30 so that liquid crystal 3 is sandwiched thereby, generating the liquid crystal panel 108. Here, the liquid crystal 3 includes, as does the general IPS-type liquid crystal panel, a compound including CN group.

Described below is the operation in the first embodiment. To the liquid crystal display apparatus, a video signal, and a horizontal/vertical synchronizing signal are to be inputted. The echo suppression circuit 100 corrects the incoming video signal in a manner as will be described later to suppress an echo phenomenon which occurs when a video signal including moving images is displayed on the liquid crystal display 108. The controller 102 operates the liquid crystal panel with AC drive through the source driver 104 and the gate driver 106 based on the video signal thus corrected by the echo suppression circuit 100, for example.

Described next is the operation of the echo suppression circuit 100. Focusing on one pixel, in the conventional drive method, a voltage such as the one shown in FIG. 4(*a*) is applied to the liquid crystal. In this case, the voltage to be applied to the liquid crystal is out of balance between positive and negative, and therefore the above described echo phenomenon occurs in streaks. In the present embodiment, on the other hand, the video signal is corrected by the echo suppression circuit 100 in such a manner as to balance, between positive and negative, the voltage to be applied to the liquid crystal. Accordingly, as shown in FIG. 4(*b*), FIG. 4(*c*), or FIG. 4(*d*), the voltage which is in balance between positive and negative can be applied to the liquid crystal.

The echo suppression circuit 100 divides the video signal into a pair of two successive frames, and for every pair, compares these two frames in terms of signal level. Then, if these frames are determined as being not the same in signal level, the signal is corrected so as to be the same in signal level between these two frames. At this time, for example, the higher signal level may be used as a correction basis, or the lower signal level may be used as the correction basis. Alternatively, an average signal level may be taken between these two frames to use such average signal as the correction basis, or any other levels may be used as the correction basis. FIG. 4(*b*) shows the drive voltage to the liquid crystal with the correction basis of the lower level, FIG. 4(*c*) shows the drive voltage to the liquid crystal with the correction basis of the higher level, and FIG. 4(*d*) shows the drive voltage to the liquid crystal with the correction basis of the average level.

Figure 4:
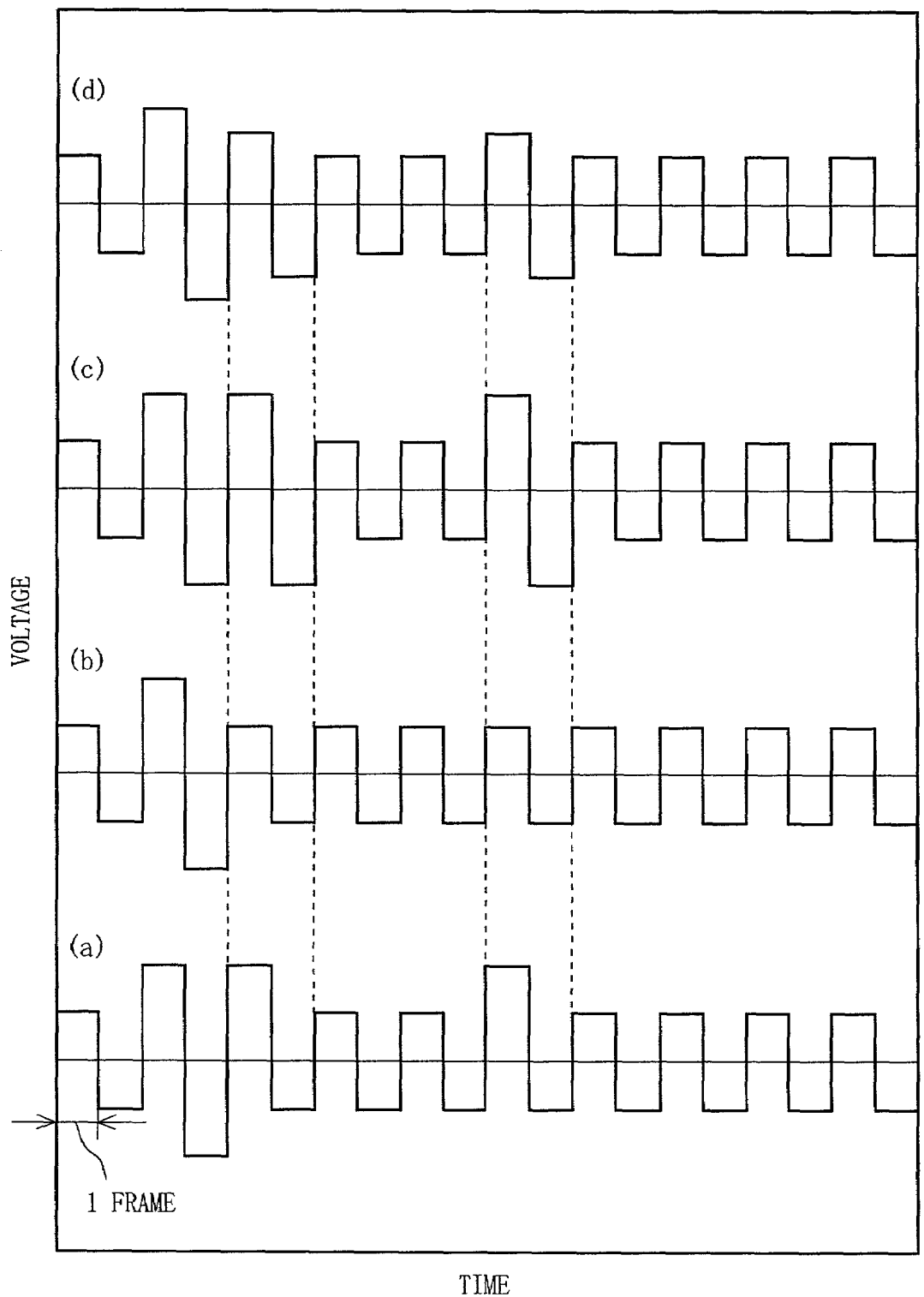
FIG. 4 is a diagram showing waveforms of a voltage to be applied to a pixel.

As shown in FIG. 4(*b*) or FIG. 4(*c*), by using the higher level (maximum) or the lower level (minimum) of the compared frames as a basis of correcting the signal level thereof, contrast between bright and dark is emphasized to a greater degree than in the case where the average level is taken between the frames to use it as the basis as shown in FIG. 4(*d*). Accordingly, there is such an advantage that the time-base representation of videos will become well-defined. On the other hand, by using the average level of the frames as the basis as shown in FIG. 4(*d*), a gradual temporal change in tone can be achieved so that the moving images can be advantageously displayed more smoothly. Also, by using the average level of the frames as the basis, a change occurring to the sum of the absolute values of the drive voltage is smaller a compared with the case where no correction is performed. Since human eyes hardly perceive a change in brightness caused by correction in such a manner, there is an advantage that correction can be performed without that much influence.

Alternatively, correction may always be performed on the basis of either the maximum value or the minimum value, or the basis may be switched therebetween depending on the situation. In the case where correction is always performed on the basis of either the maximum value or the minimum value, the circuit structure can be advantageously simplified. Alternatively, as an example, a reference intermediate tone level (e.g., a value which is exactly in the middle between the maximum tone level and the minimum tone level of the display apparatus) may be provided. According to the level of the video signal, correction may be performed based on either the maximum value or the minimum value, whichever is farther from this reference intermediate tone level. Through such correction, the resultant signal turns out to be brighter or darker than the intermediate tone so that videos are advantageously well-defined easily.

Figure 5:
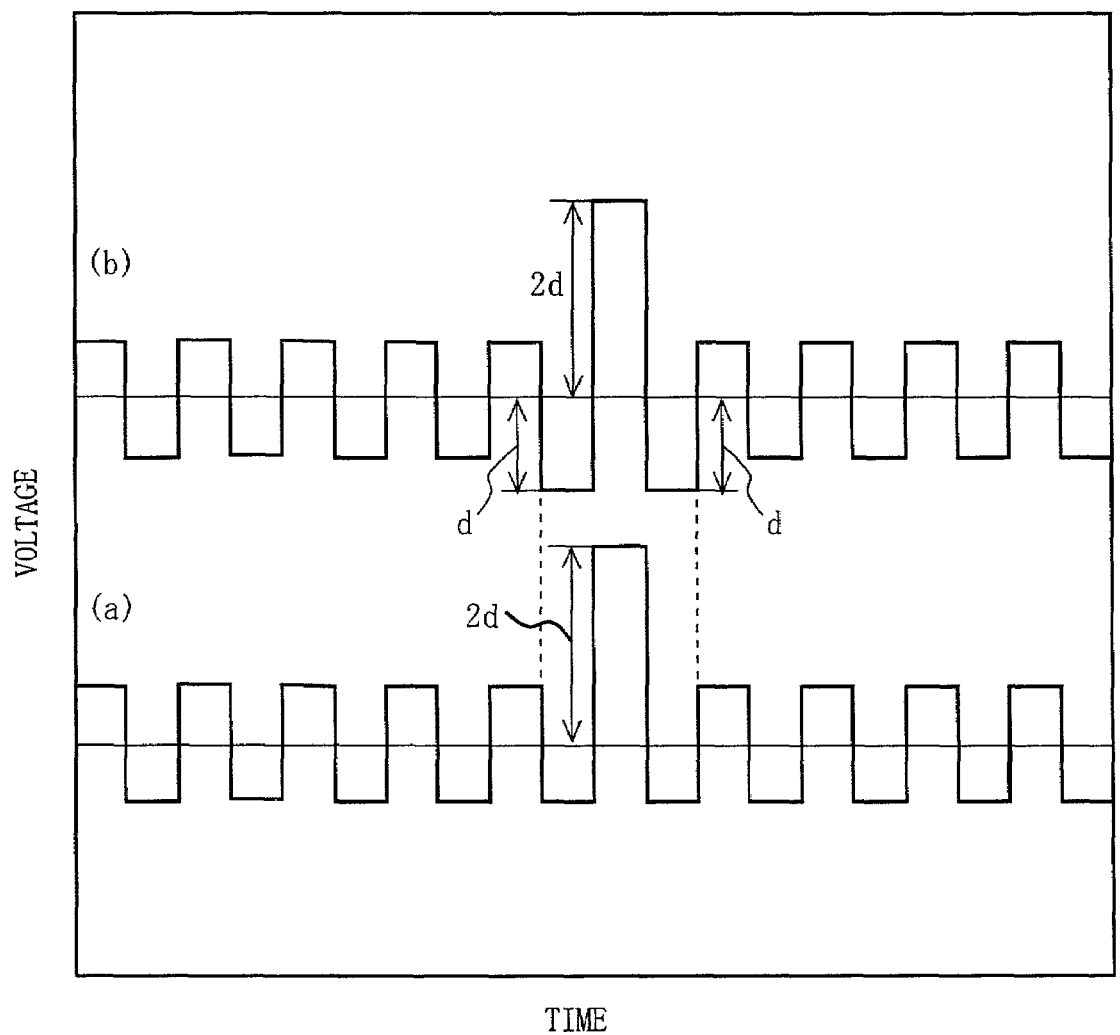
FIG. 5 is a diagram showing waveforms of a voltage to be applied to a pixel.

Here, in the present embodiment, the drive voltage level is first compared for every two frames, and then the video signal is corrected so as to equalize the signal level between those two frames. This is not restrictive, and the number of frames used as the basis of correcting the video signal to balance the drive voltage level between positive and negative may be three or four, for example. To be specific, as an alternative to the conventional drive method shown in FIG. 5(*a*), the video signal may be corrected on the basis of three frames as shown in FIG. 5(*b*) to balance the drive voltage level between positive and negative. By increasing the number of frames to be compared as such, adjustment for incoming video signals can be done more flexibly as compared with the case where adjustably balancing between positive and negative for every two frames as in the present embodiment, and thus there is an advantage in that correction can be performed without that much influence. Assuming here that the drive voltage is adjustably balanced between positive and negative on a frame basis of three or more frames. If the balance adjustment between positive and negative is done not by correcting any frame signal at least a maximum or minimum in signal level among a plurality of frames to be used as the basis but by using any other frame signal, any image characteristic point (e.g., conspicuously bright part or dark part) is prevented from being lost or becoming inconspicuous as a result of correction. Therefore, image degradation due to correction can be suppressed. Further, through such correction as not changing the sum of the absolute values of the drive voltage on the basis of frames, correction can be performed, without that much influence, so as not to make a change in brightness caused thereby perceivable that much.

Here, the brightness of the liquid crystal display element is proportional to about the square of the drive voltage. Generally, in the display apparatus, the relationship between a tone signal and the brightness is also proportional to about the square of the drive voltage. Accordingly, to perform correction in a manner so as not to change the sum of the absolute values of the brightness with more accuracy, correction may be performed so as not to change the sum of the square of the drive voltage. If this is the case, correction can be performed, without that much influence, so as to make a change in brightness caused thereby unperceivable. Note here that, retaining the sum of the absolute values as mentioned in the above is easier for realization with circuits, for example.

Here, those various correction methods described above may be changed as appropriate depending on the situation. For example, those correction methods exemplified by FIG. 4(b), FIG. 4(c), and FIG. 4(d) may be all used for correction by switching thereamong depending on what the video scenes are for.

Note here that, although many of the correction methods are exemplified in the above, what is important to suppress the echo phenomenon is performing correction in a manner that the drive voltage can be balanced better between positive and negative. In consideration thereof, any other arbitrary correction methods which can achieve that are surely applicable as well. Moreover, the video signal is subjected to correction to balance the drive voltage between positive and negative in the present embodiment. This is not the only possibility, and the drive voltage to be outputted from the controller 102 may be subjected to correction.

In order to operate as such, although not shown, the echo suppression circuit 100 needs to include a memory for storing video signals of a plurality of fields, a computation part for comparing the signal level among those fields, and a circuit for controlling the memory and computation part. As to its circuit structure, however, there is no specific limitation, although a low-priced simple circuit is preferable.

Figure 6:
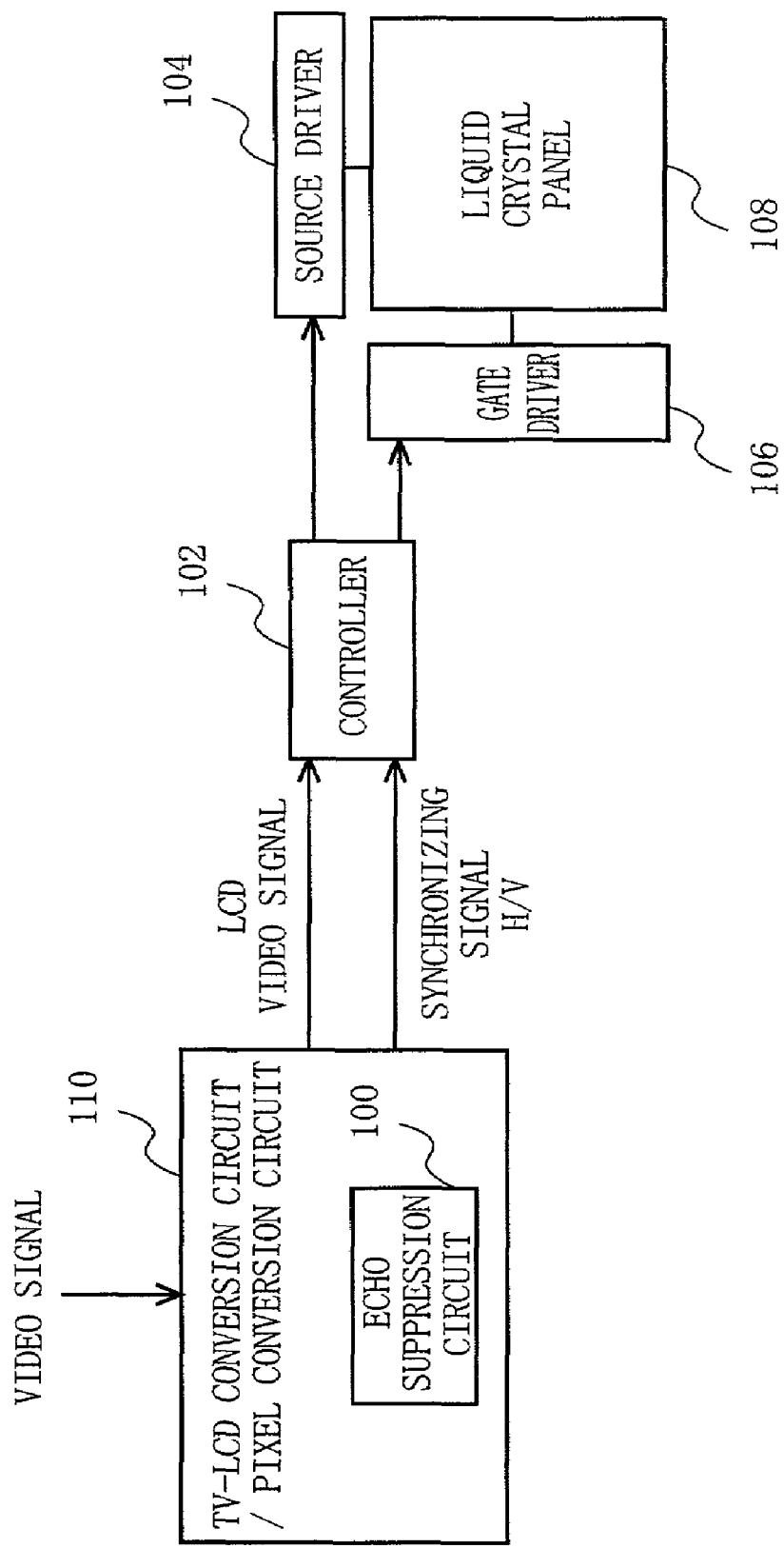
FIG. 6 is a block diagram showing the structure of a modification example of the first embodiment.

Further, in the present embodiment, as shown in FIG. 1, the echo suppression circuit 100 is structured separately from other constituents, but this is not restrictive. As shown in FIG. 6, for example, the echo suppression circuit 100 may be functionally incorporated, in terms of process, into a TV-LCD conversion circuit 110 for inputting TV signals into the liquid crystal panel 108, or a pixel conversion circuit 110 for resolution conversion, for example. If this is the case, the number of constituents that are required, for the liquid crystal display apparatus can be reduced, and thus the liquid crystal display apparatus can be realized at relatively low cost.

Still further, in the present embodiment, correction is performed for every pair of two frames in such a manner as to equalize the absolute values of the drive voltage. This is not restrictive, and bringing the absolute values closer to each other as much as possible can also reduce the echo phenomenon. Specifically, the echo phenomenon provably shows considerable improvement when correction is performed so as to keep a difference of absolute values a half of the maximum drive voltage or smaller. Furthermore, when correction is performed so as to keep the difference of absolute values smaller than a tenth thereof, the echo phenomenon is successfully suppressed to a level that is unobservable by the naked eye. These results show that limitedly performing correction only when any two successive frames show a difference of absolute values of the drive voltage being a tenth of the maximum drive voltage or larger will lead to more efficiency at the time of correction.

Still further, in the present embodiment, correction is performed so as to balance the drive voltage between positive and negative on the basis of a plurality of frames. This is not restrictive, and correction may be performed, for example, sequentially through frame comparison, one frame with another frame precedent thereto. If this is the case, with respect to any frame to be corrected, considering not only a frame precedent thereto but also another frame subsequent thereto may give more flexibility to the amount of frame correction to be determined.

As described in the foregoing, according to the first embodiment, by correcting video signals composed of frames or a drive voltage on the basis of a plurality of frames in such a manner as to balance, between positive and negative, the drive voltage to liquid crystal, an echo phenomenon can be prevented when moving images are displayed.

Second Embodiment

Figure 7:
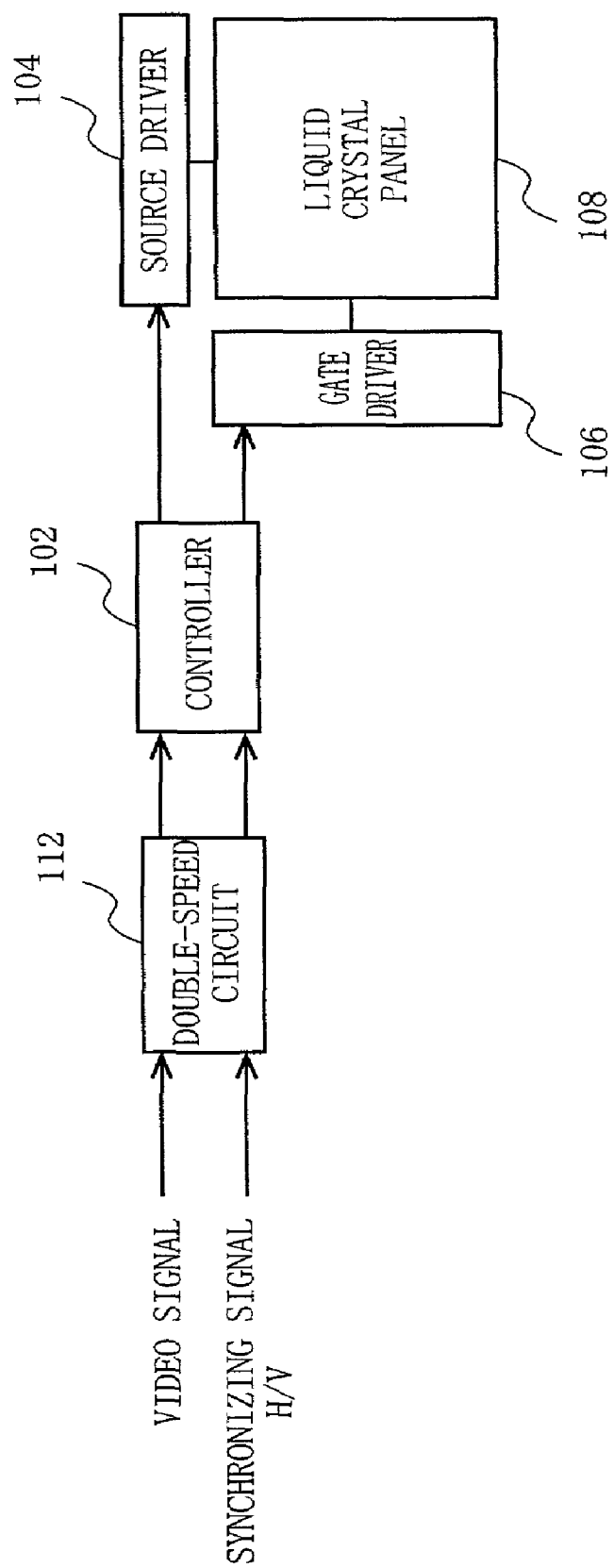
FIG. 7 is a block diagram showing the structure of a liquid crystal display apparatus according to a second embodiment of the present invention.

In a second embodiment of the present invention, the above-described echo phenomenon is prevented by alternating the polarity of a drive voltage with which a liquid crystal panel is driven, whereby the drive voltage is adjusted so as to balance between positive and negative for each frame. FIG. 7 shows the structure of a liquid crystal display apparatus according to the second embodiment of the present invention. In FIG. 7, the liquid crystal display apparatus includes a double-speed circuit 112, the controller 102, the source driver 104, the gate driver 106, and the liquid crystal panel 108. The operation of the liquid crystal display apparatus in the present embodiment is described below.

The double-speed circuit 112 converts, based on a incoming video signal and a synchronizing signal to be inputted, a frame frequency of the incoming video signal to be doubled. The controller 102 performs timing control of the source driver 104 and the gate driver 106, and AD drive control of the liquid crystal panel 108 based on an output from the double-speed circuit 112. The structure and the operation of the double-speed circuit 112 is described in more detail below.

Figure 8:
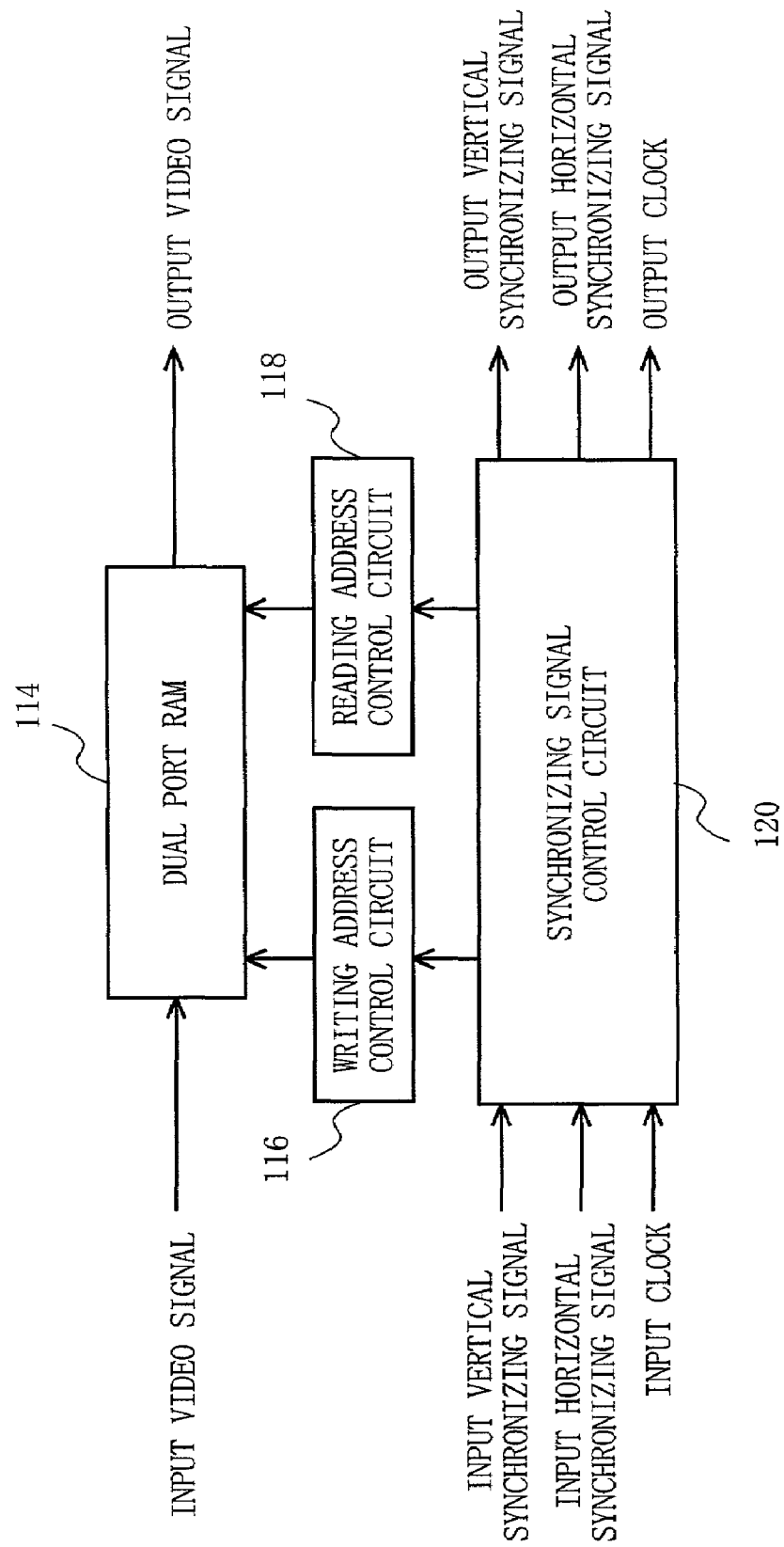
FIG. 8 is a block diagram showing the structure of a double-speed circuit 112.

FIG. 8 is a block diagram showing an exemplary structure of the double-speed circuit 112 of the present embodiment. In FIG. 8, the double-speed circuit 112 includes a dual port RAM 114, a writing address control circuit 116, a reading address control circuit 118, and a synchronizing signal control circuit 120.

The dual port RAM 114 is a random access memory in which a writing address/data port and a reading address/data port are provided separately, and thus, writing and reading can be performed separately. An incoming video signal is inputted into the writing port of the dual port RAM 114, and according to a writing address coming from the writing address control circuit 116, is written into the dual port RAM 114. The video signal data that is written into the dual port RAM 114 is then read and outputted by the dual port RAM 114 in accordance with a reading address coming from the reading address control circuit 118. In response to an input vertical synchronizing signal, an input horizontal synchronizing signal, and an input clock, the synchronizing signal control circuit 120 controls both the writing address control circuit 116 and the reading address control circuit 118, and also outputs an output vertical synchronizing signal, an output horizontal synchronizing signal, and an output clock which are all converted in frequency to be doubled with respect to the inputs. The operation of the double-speed circuit 112 is described more specifically below by referring to FIG. 9.

Figure 9:
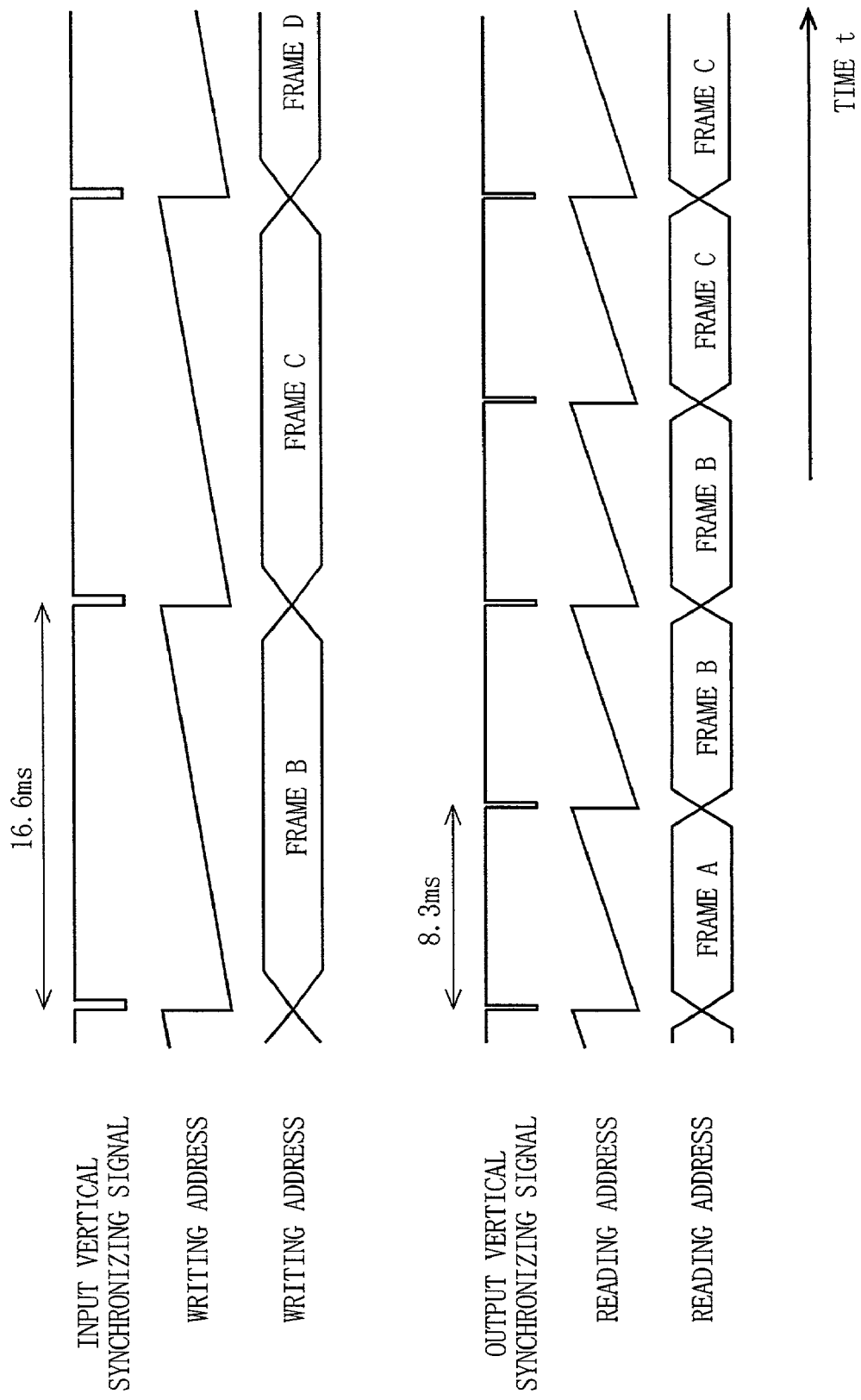
FIG. 9 shows timing charts of the operation of the double-speed circuit 112.

FIG. 9 is a set of timing charts showing the operation of the double-speed circuit 112 of the present embodiment. In FIG. 9, the lateral axis indicates time, and in the vertical direction, a signal size is indicated for the input/output vertical synchronizing signals and an address is indicated for the writing/reading addresses. As shown in FIG. 9, the writing address outputted from the writing address control circuit 116 is counted up responding to a clock input, and reset to a vertical blanking interval in response to the input vertical synchronizing signal. The writing data is an input video signal, and a frame of the input video signal is stored on the dual port RAM 114. The reading address is, on the other hand, counted up in response to an output clock which is the one obtained by multiplying the input clock by a PLL, for example, and is reset by a frequency which is the two-fold of the frequency of the input vertical synchronizing signal. If the timing of resetting the count of the reading address is synchronized with the timing of resetting the count of the writing address, and if the count reset timing of the reading address coincides with the count reset timing of the writing address once to twice, any images showing discontinuity caused by writing and reading getting out of order can be removed to the outside of the effective screen. As such, the double-speed circuit 112 is realized from which one frame of the input video signal is outputted at the doubled frame frequency twice in a row.

Figure 10:
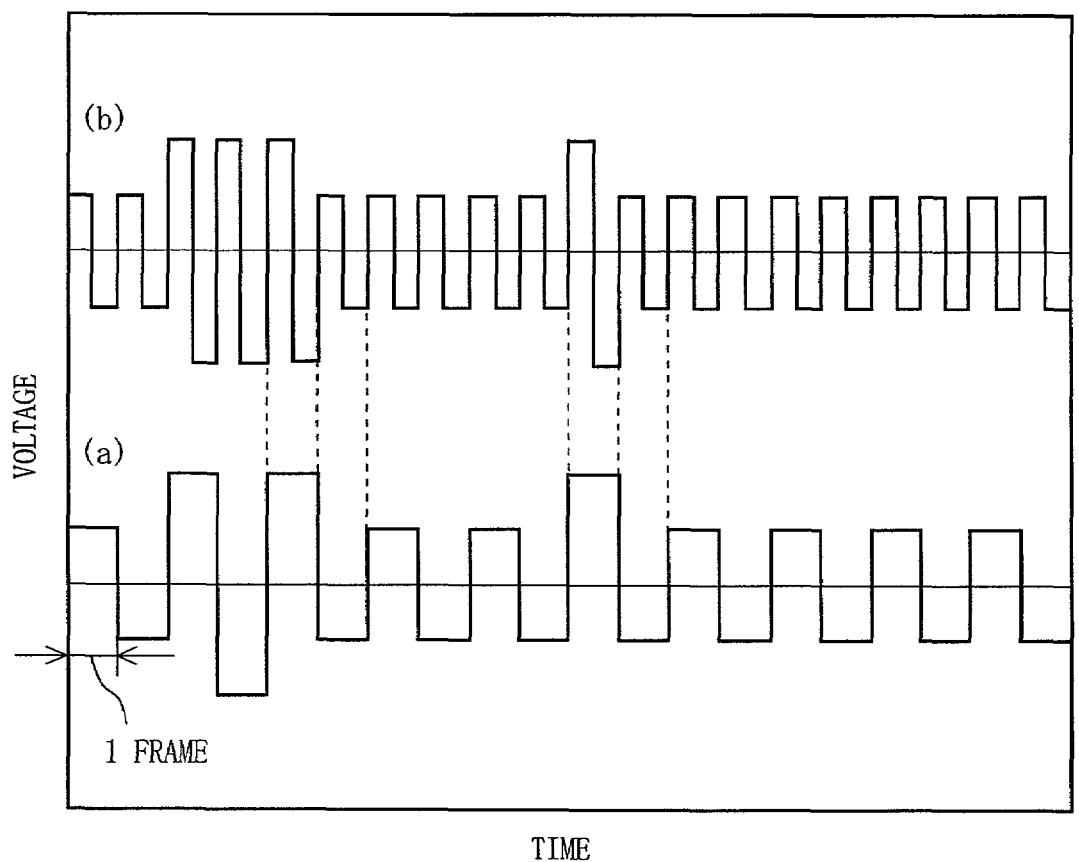
FIG. 10 is a diagram showing waveforms of a voltage to be applied to a pixel.

FIG. 10(*a*) is a diagram showing a change occurring to the drive voltage to the liquid crystal of a focusing pixel when the liquid crystal is driven under the conventional drive method. FIG. 10(*b*) is, on the other hand, a diagram showing a change occurring to the drive voltage to the liquid crystal of the focusing pixel when the liquid crystal is driven under the drive method of the present embodiment. As shown in FIG. 10(*b*), in the present embodiment, the drive voltage to the liquid crystal is balanced between positive and negative on a frame basis. That is, the polarity of an electric field applied to the liquid crystal of the pixel A is in balance between positive and negative even during pattern passing and thereafter. Therefore, the problem of uneven ion distribution in the liquid crystal panel can be prevented in a period for vertical scanning the video signal which is originally inputted. As a result, there occurs no tail echo when displaying moving images, which is the problem occurring in the conventional liquid crystal display apparatus.

As such, according to the present embodiment, the incoming video signal is converted so as to be doubled in frame frequency for operating the liquid crystal panel with AC drive. In more detail, each frame of the original video signal is further divided into two periods (sub frames) of a normal period and a compensation period, the length of which is the same. The polarity is changed between the normal period and the compensation period for driving the liquid crystal panel, canceling out the progress of uneven distribution of the ions for each frame of the video signal. In such a manner, regardless of the pattern in which the displaying moving images are, the ions will never be distributed unevenly to a further extent, and the insulator film will never be polarized to a further extent. Accordingly, image degradation as a result of the echo phenomenon can be restrained.

Here, the above-described liquid crystal panel is presumed to be the IPS-type liquid crystal panel. This is not the only option, and whatever arbitrary liquid crystal panel in which the echo phenomenon is observed can surely restrain image degradation as a result of the echo phenomenon.

Further, the above-described double-speed circuit 112 is structured by the dual port RAM 114. The double-speed circuit 112 can also be realized by using a single port RAM to share writing and reading by time. Moreover, the double-speed circuit 112 is not limited in structure as such, and any other arbitrary structure is surely applicable thereto. In terms of simplicity and low cost, the above described structure is considered to be preferable.

Note that, in the present embodiment, the original video signal is simply doubled in frame frequency for operation with the vertical scanning period that is divided into the normal period and the compensation period being the same in length. This is not restrictive, and the ratio between the normal period and the compensation period may be arbitrary. Here, if the normal period and the compensation period are set the same in length, the signal needs only to be simply doubled so that the circuit structure is simplified. It should be noted here that some combination of the panel structure, the liquid crystal material, and the orientation film, for example, may vary ion behavior depending on whether the frame is driven by the positive drive voltage or negative. Therefore, it is preferable that the length ratio between those two sub frames is optimally set in consideration of the ion behavior.

Here, in the present embodiment, the drive voltage is sequentially switched between positive and negative in order depending on which frame is in the normal period or in the compensation period, and this switching order is not restrictive. For example, is the switching order may so set that the normal period of the n-th frame is driven by the positive voltage and the compensation period thereof by the negative voltage, and the normal period of the n+1-th frame is driven by the negative voltage and the compensation period thereof by the positive voltage. If this is the case, the compensation period of the n-th frame and the normal period of the n+1-th frame become the same in polarity as the drive voltage. Therefore, the compensation voltage of the preceding frame will have precharge effects so that the voltage step at the time of writing the drive voltage of the normal period is minimal. As a result, the required level of the charge capacity of the TFT can be advantageously lowered.

Note that, in the present embodiment, in the double-speed circuit 112, signals are doubled in speed by using a memory which is provided for storing video signals. This is not restrictive, and speed-doubling may be carried out by using a delay circuit, for example. If such a delay circuit is used, the double-speed circuit 112 can be manufactured at lower cost since the memory is not burdened, but at higher speed, the reliability of signals is decreased.

Figure 11:
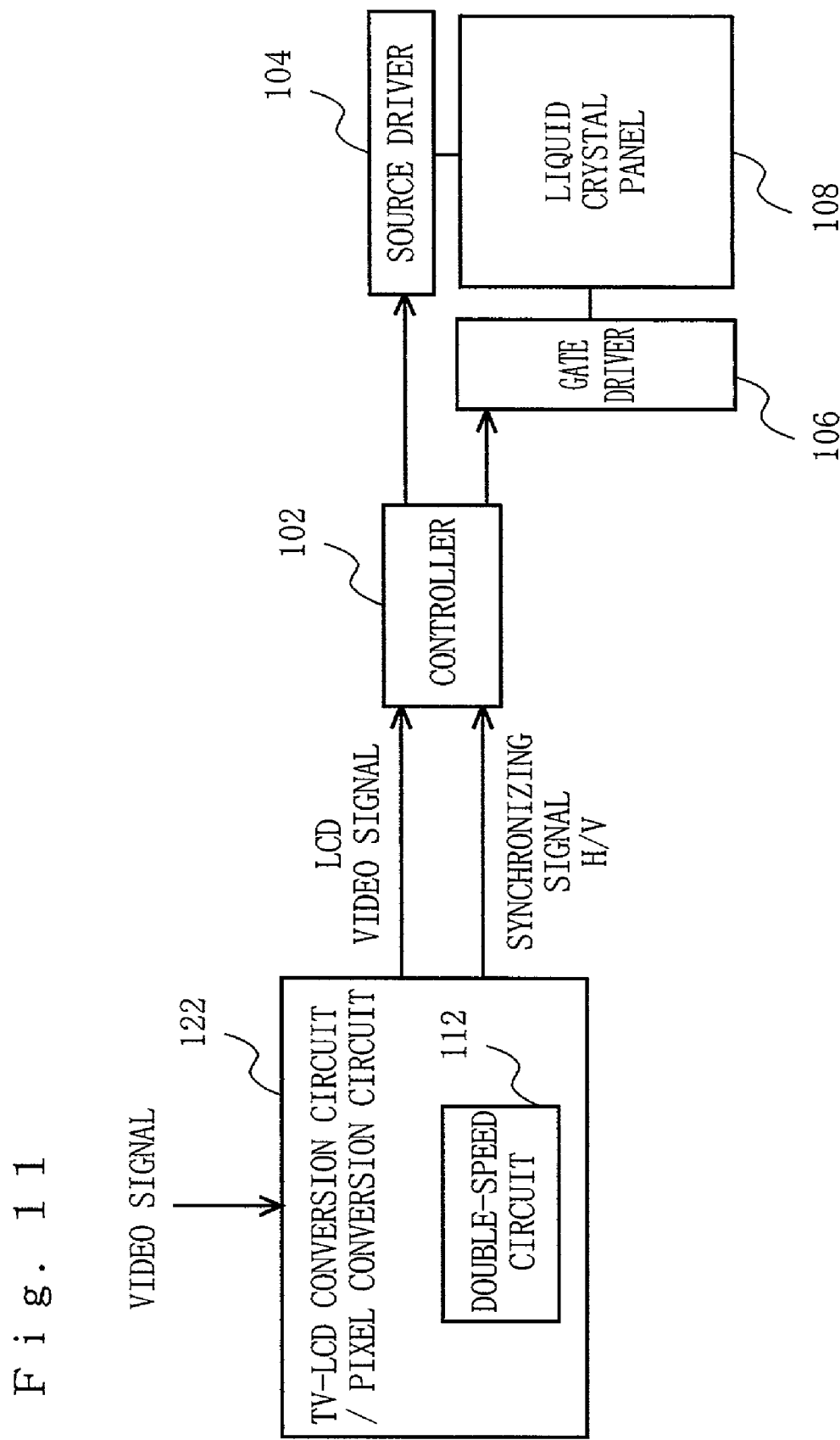
FIG. 11 is a block diagram showing the structure of a modification example of the second embodiment.

Further, in the present embodiment, the proprietary circuit is used for speed-doubling. As shown in FIG. 11, for example, the double-speed circuit 112 may be functionally incorporated into a TV-LCD conversion circuit 122 for inputting TV signals into the liquid crystal panel, or a pixel conversion circuit 122 for resolution conversion, for example. If this is the case, the number of required constituents can be reduced, and thus, the liquid crystal display apparatus can be realized at relatively low cost.

As described in the foregoing, in the second embodiment, each video signal is divided into two sub frames for driving the liquid crystal. Thus, signal application to one pixel in one frame needs to be done twice, making pixel design difficult in the liquid crystal display apparatus of a higher resolution (XGA or higher). To deal with this problem, as a method of enabling high-speed scanning in such a liquid crystal display apparatus, there is a method of doubling a time taken for selecting one scanning line, and driving the device in such a manner that a half of the time for selecting one scanning line is superposed on a time for selecting the next scanning line, or a method of gradually changing the capacity Cst, Cgd, or the like, on a pixel basis, for example. However, even under these techniques, designing the TFT, for example, becomes more difficult as the resolution gets higher.

Therefore, as shown in more detail below, a third embodiment provides such a structure for easily enabling the high speed scanning in the liquid crystal display apparatus.

Third Embodiment

Figure 12:
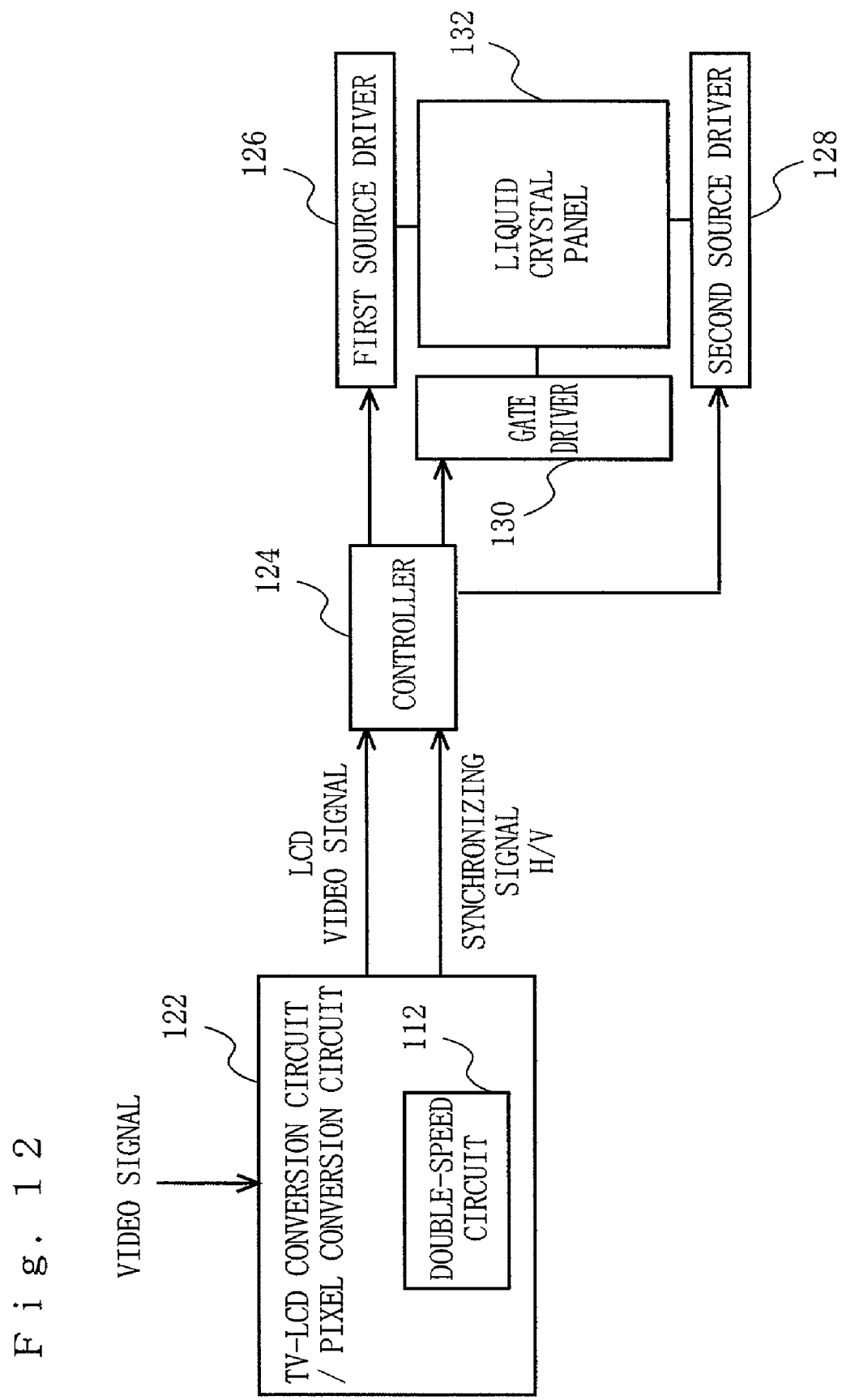
FIG. 12 is a block diagram showing the structure of a liquid crystal display apparatus according to a third embodiment of the present invention.
Figure 13:
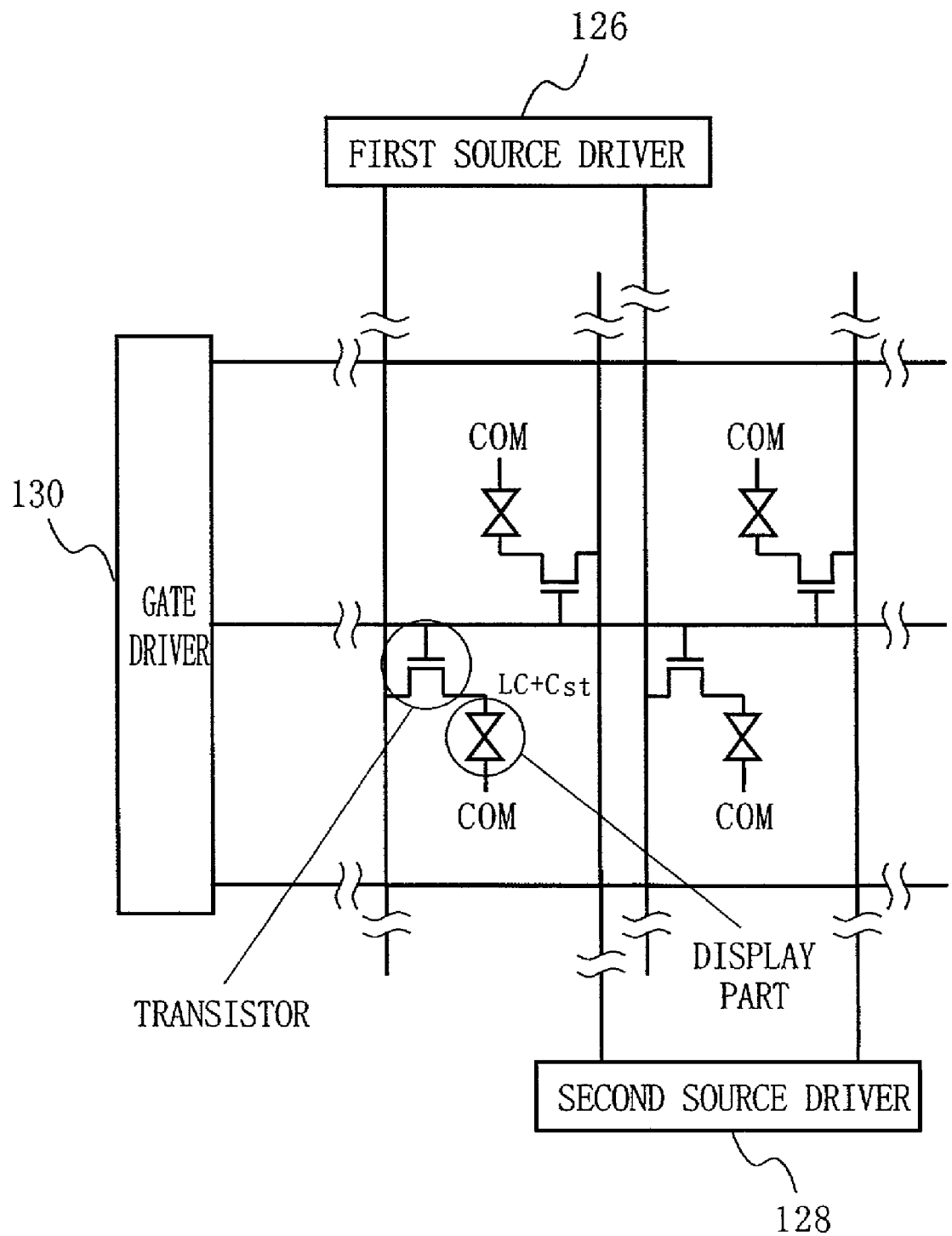
FIG. 13 is a diagram showing the structure of a liquid crystal panel 132.

FIG. 12 shows the structure of a liquid crystal display apparatus according to a third embodiment of the present invention. Here, in FIG. 12, any constituent identical to that of FIG. 11 is provided with the same reference numeral, and is not described again. A controller 124 controls a first source driver 126, a second source driver 128, and a gate driver 130. FIG. 13 shows the TFT arrangement of a liquid crystal panel 132. In the present embodiment, as shown in FIG. 13, the number of data signal lines is doubled, and pixels for two lines are to be driven by one scanning line. As a result, the time that is taken for scanning one scanning line can be doubled. In other words, the number of the scanning lines can be reduced to half without lowering the resolution in the vertical direction. Therefore, even with double-speed drive, the time that is taken for scanning one scanning line can remain the same as conventional. Here, since the number of the source lines is doubled, wiring density is increased in the part where the source driver is incorporated. To avoid this, the source driver may be divided into two, and provided at two positions as shown in FIG. 13.

Fourth Embodiment

Figure 14:
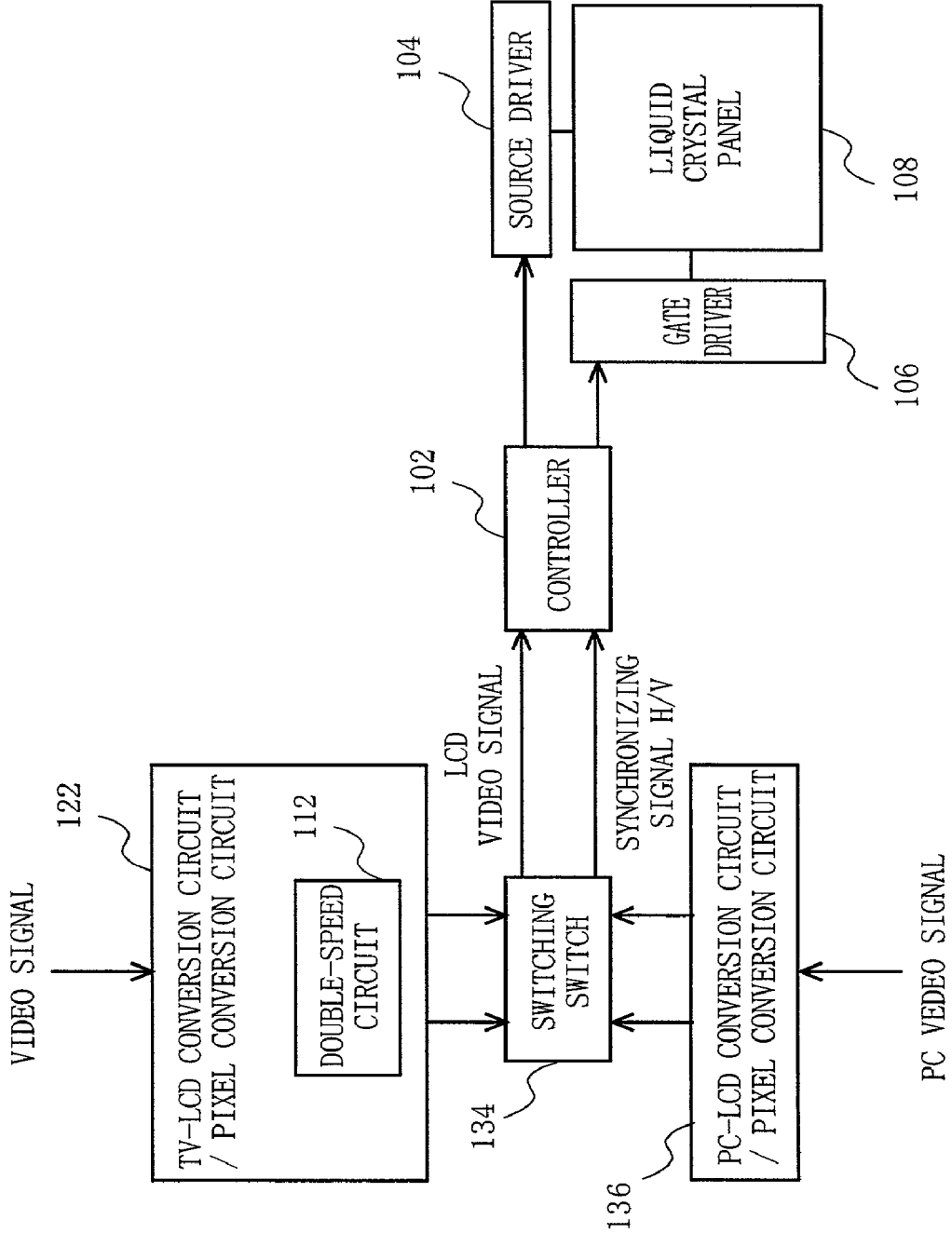
FIG. 14 is a block diagram showing the structure of a liquid crystal display apparatus according to a fourth embodiment of the present invention.

FIG. 14 shows the structure of a liquid crystal display apparatus according to a fourth embodiment of the present invention. Here, in FIG. 14, any constituent identical to that of FIG. 11 is provided with the same reference numeral, and is not described again. This liquid crystal display apparatus performs display by switching between a TV video signal and a PC video signal by using a switching switch 134. Specifically, the TV video signal is doubled in speed at the same time as it is converted into an LCD video signal in the TV-LCD conversion circuit/pixel conversion circuit 122. On the other hand, the PC video signal is not doubled in speed when it is converted into the LCD video signal in a PC-LCD conversion circuit/pixel conversion circuit 136.

When the PC signal is outputted, a video with lower degree of movement is displayed, and thus, no echo phenomenon is observed. Accordingly, in the present embodiment, as shown in FIG. 14, when displaying moving images such as TV/VTR signals, speed-doubling is carried out as in the above described second embodiment, and the liquid crystal is driven through polarity reverse after dividing each video signal into two sub frames. When displaying the PC signal, on the other hand, in a manner similar to the conventional, the polarity of the data signal is reversed on a frame basis for driving.

As such, according to the fourth embodiment, the liquid crystal display apparatus is realized in which no echo phenomenon is observed when displaying moving images such as TV/VTR signals. Note that the current TV/VTR signals are interlace signals, and thus, the resolution in the direction of vertical scanning is ½. Thus, in order to display such TV/VTR signals, an interlace-progressive (IP) conversion circuit is required in the TV-LCD conversion circuit/pixel conversion circuit 122. Accordingly, in the present embodiment, any signal processing relating to the TV video signals is realized in one circuit, thereby reducing the number of constituents and cost. In this regard, the present embodiment is considered to be suitable for a case where video signals of moving images are interlace signals.

Fifth Embodiment

Figure 15:
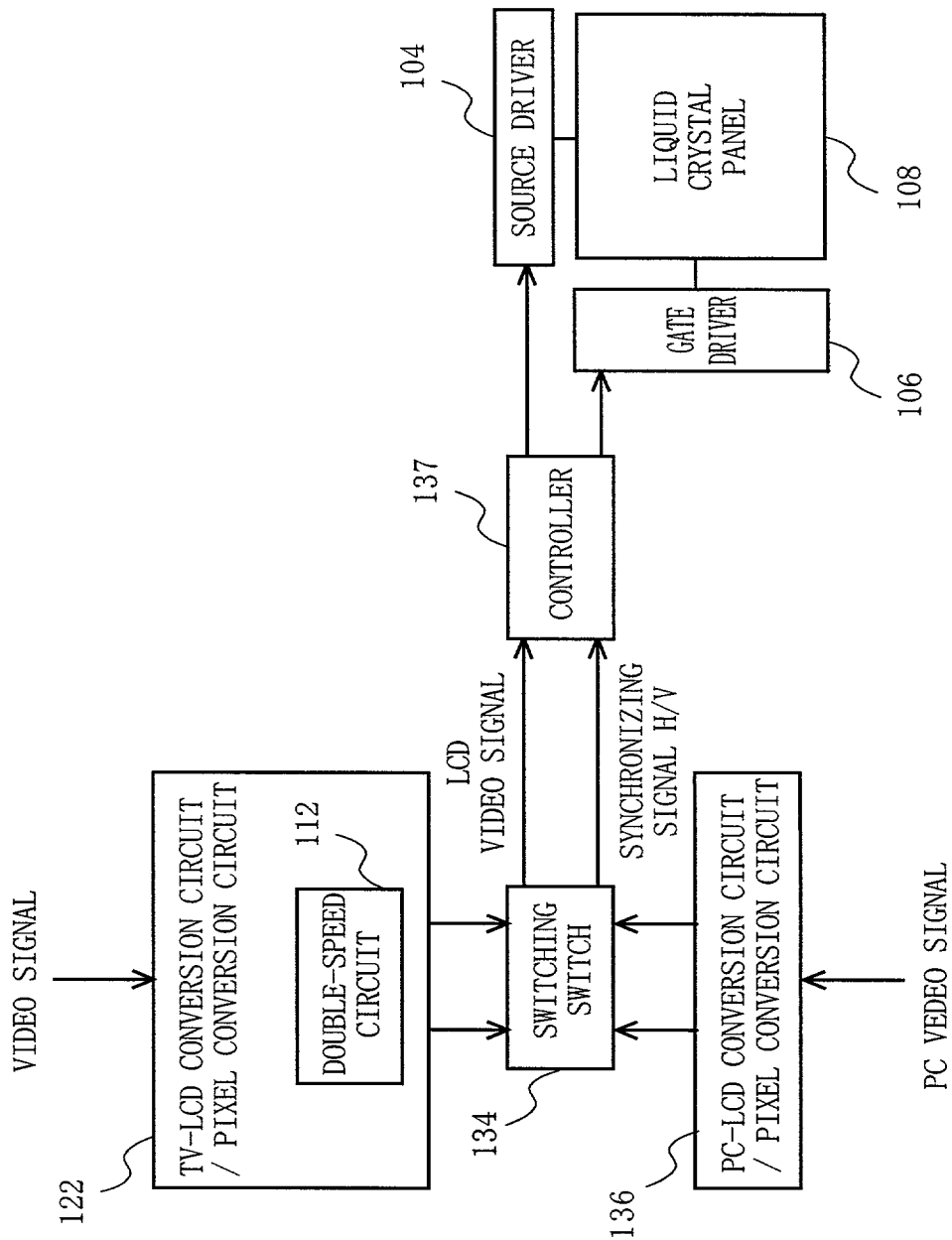
FIG. 15 is a block diagram showing the structure of a liquid crystal display apparatus according to a fifth embodiment of the present invention.

FIG. 15 shows the structure of a liquid crystal display apparatus according to a fifth embodiment of the present invention. Here, in FIG. 15, any constituent identical to that of FIG. 14 is provided with the same reference numeral, and is not described again. This liquid crystal display apparatus performs display by switching between the TV video signal and the PC video signal by using the switching switch 134.

Figure 16:
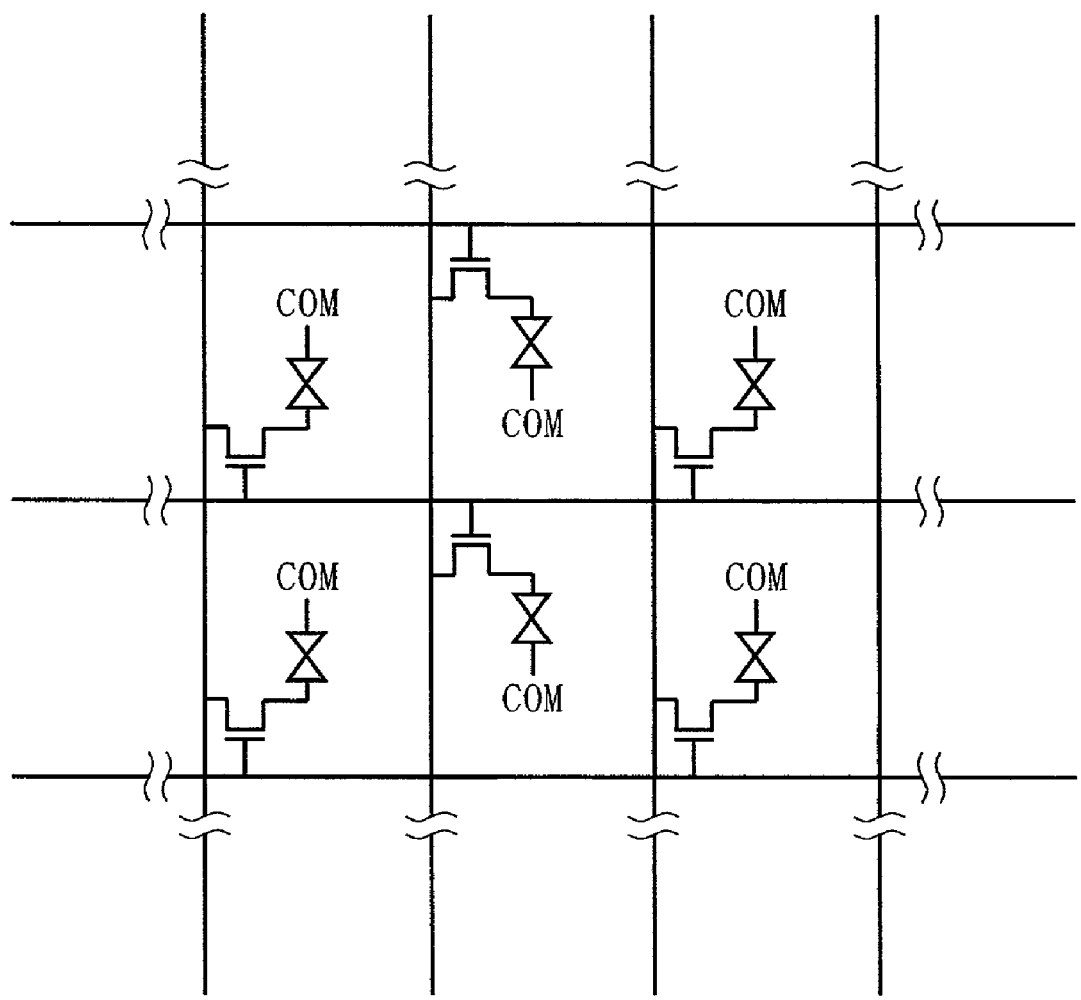
FIG. 16 is a diagram showing an exemplary structure of a liquid crystal panel.

When the PC signal is outputted, a video with lower degree of movement is displayed, and thus, no echo phenomenon is observed. Accordingly, in the present embodiment, as shown in FIG. 15, when displaying moving images such as TV/VTR signals, speed-doubling is carried out as in the above described second embodiment, and the liquid crystal is driven through polarity reverse after dividing each video signal into two sub frames. If this is the case, a controller 137 controls the gate driver 106 in such a manner as to scan two scanning lines at one time. With such a structure, those two scanning lines which are scanned at the same time are written with the same signal. Therefore, the resolution in the direction of the scanning line reduced to ½, while the charge time for one scanning line can remain the same as conventional for scanning. Here, as shown in FIG. 16, also by placing TFTs in a staggered arrangement with respect to the gate wiring, the fact that the resolution in the direction of the scanning line has been dropped to ½ can hardly be perceived by the naked eye. When displaying the PC signal, on the other hand, in a manner similar to the conventional, the polarity of the data signal is reversed on a frame basis for driving.

As such, according to the fifth embodiment, with the conventional TFT capacity, the PC signal can be displayed without lowering the resolution. Also, when displaying moving images such as TV/VTR signals, the liquid crystal display apparatus is realized in which no echo phenomenon is observed. Here, since the current TV/VTR signals are interlace signals, the resolution in the direction of the vertical scanning lines is ½. Therefore, an interlace-progressive (IP) conversion circuit is not required in the liquid crystal display apparatus of the present invention, successfully lowering the cost. Thus, the present invention is considered to be suitable for a case where video signals of moving images are interlace signals.

Sixth Embodiment

Figure 17:
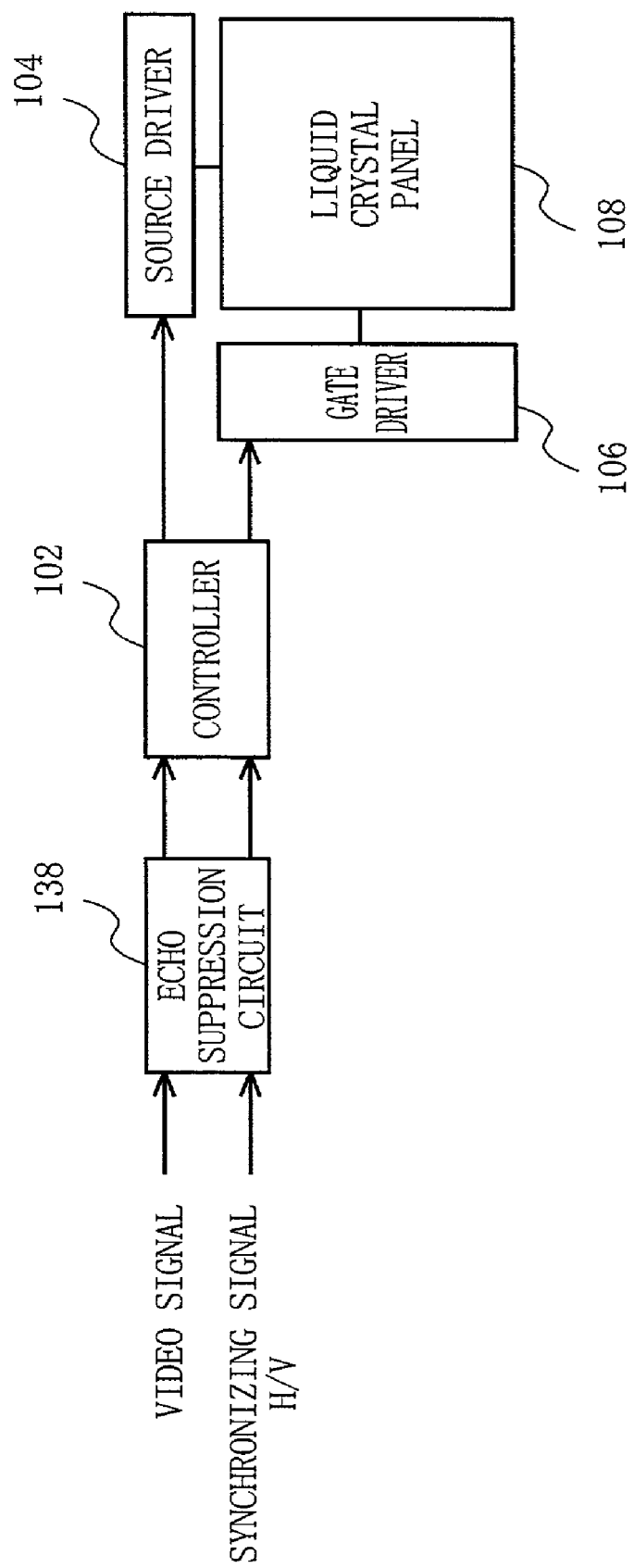
FIG. 17 is a block diagram showing the structure of a liquid crystal display apparatus according to a sixth embodiment of the present invention.

FIG. 17 shows the structure of a liquid crystal display apparatus according to a sixth embodiment of the present invention. Here, in FIG. 17, any constituent identical to that of FIG. 1 is provided with the same reference numeral, and is not described again. In the present embodiment, in an echo suppression circuit 138, for the purpose of easing uneven ion distribution, the video signal is corrected in such a manner as to insert thereto a compensation signal of a black-level voltage which hardly affects displaying videos. An exemplary case of using a panel of NB mode is described below in a specific manner.

Figure 18:
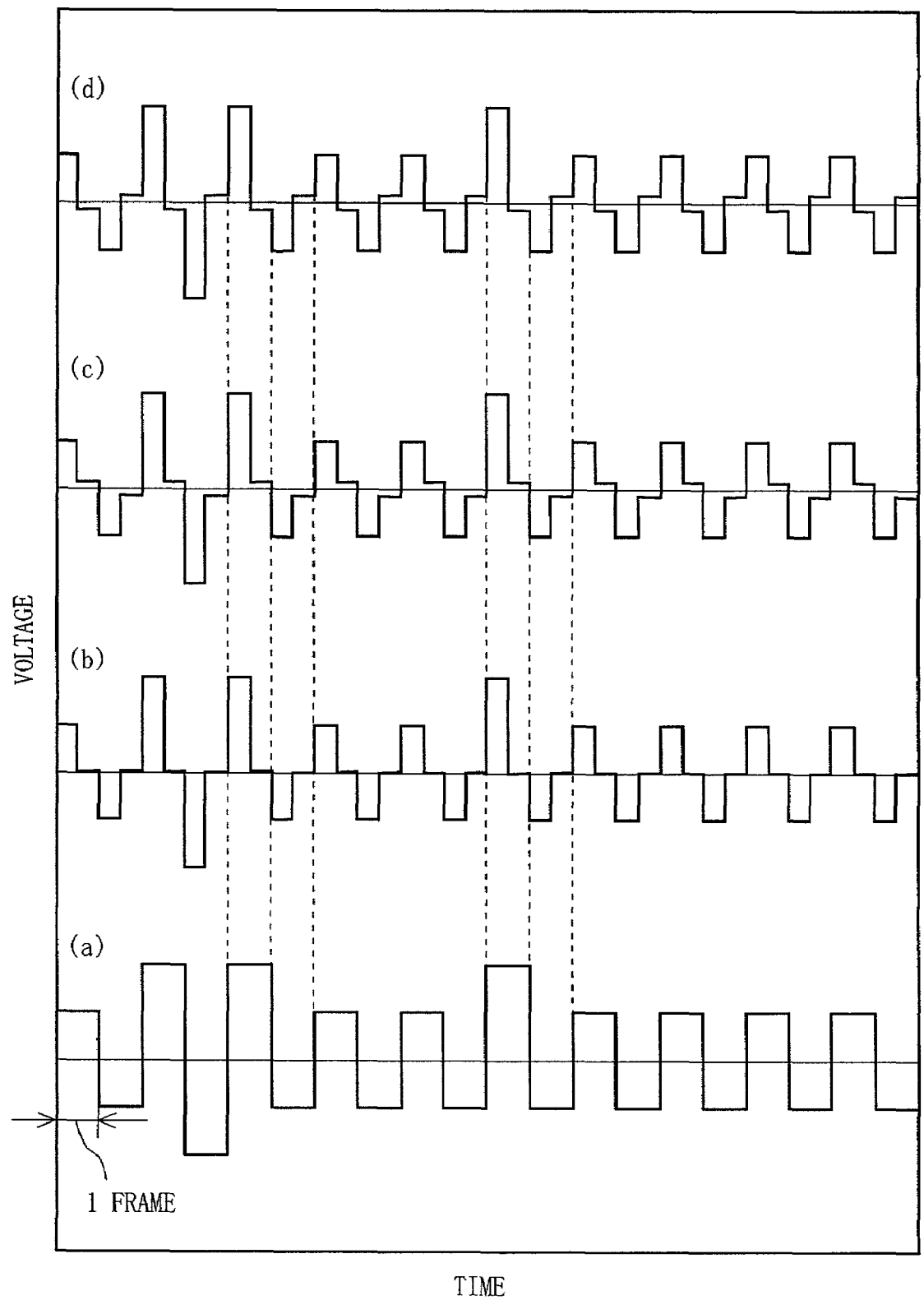
FIG. 18 is a diagram showing waveforms of a voltage to be applied to a pixel.

FIG. 18(a) shows an example of voltage application to one pixel under the conventional drive method. Also, FIG. 18(b) shows another example of voltage application to one pixel under a drive method of the present embodiment. Under the conventional drive method, the video signal is applied to each frame for the duration of a frame. On the other hand, under the drive method of the present embodiment, each frame is divided into two sub frames of a first sub frame and a second sub frame. In the first sub frame, a video signal is applied, and a black video signal, i.e., the drive voltage of 0V as a compensation signal for canceling uneven ion distribution is applied in the second sub frame. Then, on the basis of a frame (on the basis of two sub frames), the polarity of the voltage applied to the liquid crystal is reversed. Here, the length ratio between the first sub frame and the second sub frame is not necessarily required to be 1:1. The longer the length of the second sub frame, the darker the display screen becomes. Therefore, as to this length, the shorter would be the better.

In the present embodiment, through such operation, uneven ion distribution which occurs as a result of the application of the drive voltage in the first sub frame can be eased by application of the black-level voltage in the second sub frame. Accordingly, uneven ion distribution is eased in each frame, resultantly suppressing the occurrence of the echo phenomenon.

In the present embodiment, the display period for the video signal becomes shorter than one frame. Generally, the conventional liquid crystal display apparatus has been a hold-type display device, and as a common notion, moving images are considered to be easily blurred therein as compared in a pulse-type display device such as CRTs (Electrical Communications Association papers vol. 1. J68B, No. 12 (1985-12)). Under the drive method of the present embodiment, since each frame is blackened for once as already described, there is an advantage that blur inherent in the hold-type display device hardly occurs.

Here, in the present embodiment, similar to the second embodiment, signal application needs to be done twice to a single pixel on a frame basis. Accordingly, the drive methods in the third embodiment and the fourth embodiment may be combined for further effects.

Note that, in the present embodiment, the black-level voltage applied to the second sub frame is assumed to be 0V. Actually, however, the black-level voltage is often not 0V due to the manufacturing reasons of the liquid crystal display apparatus. In such a case, as exemplary voltage application to one pixel, there may be two manners as shown in FIG. 18(c) and FIG. 18(d). FIG. 18(c) shows a case where the first sub frame and the second sub frame are the same in polarity, while FIG. 18(d) shows a case where the first sub frame and the second sub frame are not the same in polarity. Here, the black-level voltage at this time is preferably of a pedestal level or lower. Further, to the second sub frame, applying the black level which is different in polarity from that to the first sub frame as shown in FIG. 18(d) is better than applying the black level which is the same in polarity from that to the first sub frame as shown in FIG. 18(c). This is because, uneven ion distribution is thereby easily eased, and thus, it is considered preferable in view of suppressing the echo phenomenon.

Here, the voltage of pedestrian level or lower means the voltage showing an absolute value which is farther from white than the original black signal. By taking a liquid crystal display apparatus in NB mode as an example, the relationship of T-V property (brightness-voltage property) will be of such a relationship as the one shown in FIG. 19(a). A voltage AA shown in FIG. 19(a) is the voltage at the time of displaying a black signal based on the video signal in the normal manner. In the liquid crystal display apparatus in NB mode, the voltage of the pedestal level or lower means the voltage which is equal to or lower than the voltage AA. By using the voltage which is lower than the pedestal level as a compensation signal, the change observed in absolute values between the video signal and the compensation signal becomes larger than the case where the general black-level voltage (voltage AA) is used. As a result, uneven ion distribution is cancelled much faster, and accordingly, the echo phenomenon can be suppressed more effectively. Here, in the case of a liquid crystal display apparatus in NW mode, the relationship of T-V property will be of such a relationship as the one shown in FIG. 9(b). Accordingly, to achieve the same effects as the case of NB mode described above, as a compensation signal, the voltage which is equal to or higher than the pedestal level, that is, the voltage which is equal to or higher than the general black-level voltage (voltage BB) may be used.

Further, in the present embodiment, there is a need to write the signal voltage to each pixel on the basis of a scanning line in the first sub frame, but in the second sub frame, the same compensation voltage is written into each pixel. Thus, n lines (e.g., four lines) may be written with the compensation signal all at once. If so, the writing period of the second sub frame can be reduced to 1/n compared with the writing period of the first sub frame. As a result, the charge time for a scanning line to which the signal voltage is written can be longer, and thus, demands for the charging property of the TFT can be eased.

Seventh Embodiment

Figure 20:
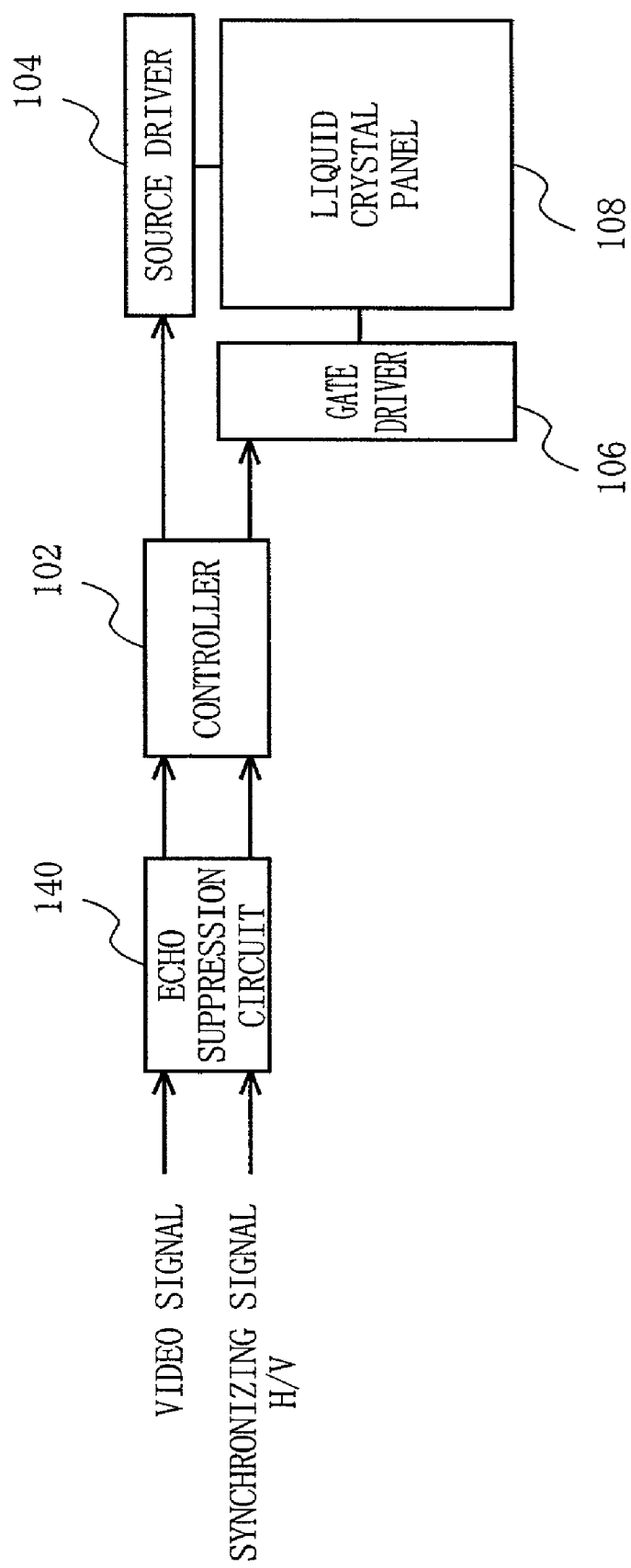
FIG. 20 is a block diagram showing the structure of a liquid crystal display apparatus according to a seventh embodiment of the present invention.

FIG. 20 shows the structure of a liquid crystal display apparatus according to a seventh embodiment of the present invention. Here, in FIG. 20, any constituent identical to that of FIG. 1 is provided with the same reference numeral, and is not described again. In the present embodiment, similar to the sixth embodiment described above, in an echo suppression circuit 140, a video signal is corrected so as to be inserted with a compensation signal of a black-level voltage which hardly affects displaying videos for the purpose of easing uneven ion distribution. An exemplary case of using a panel in NB mode is described below more specifically.

Figure 21:
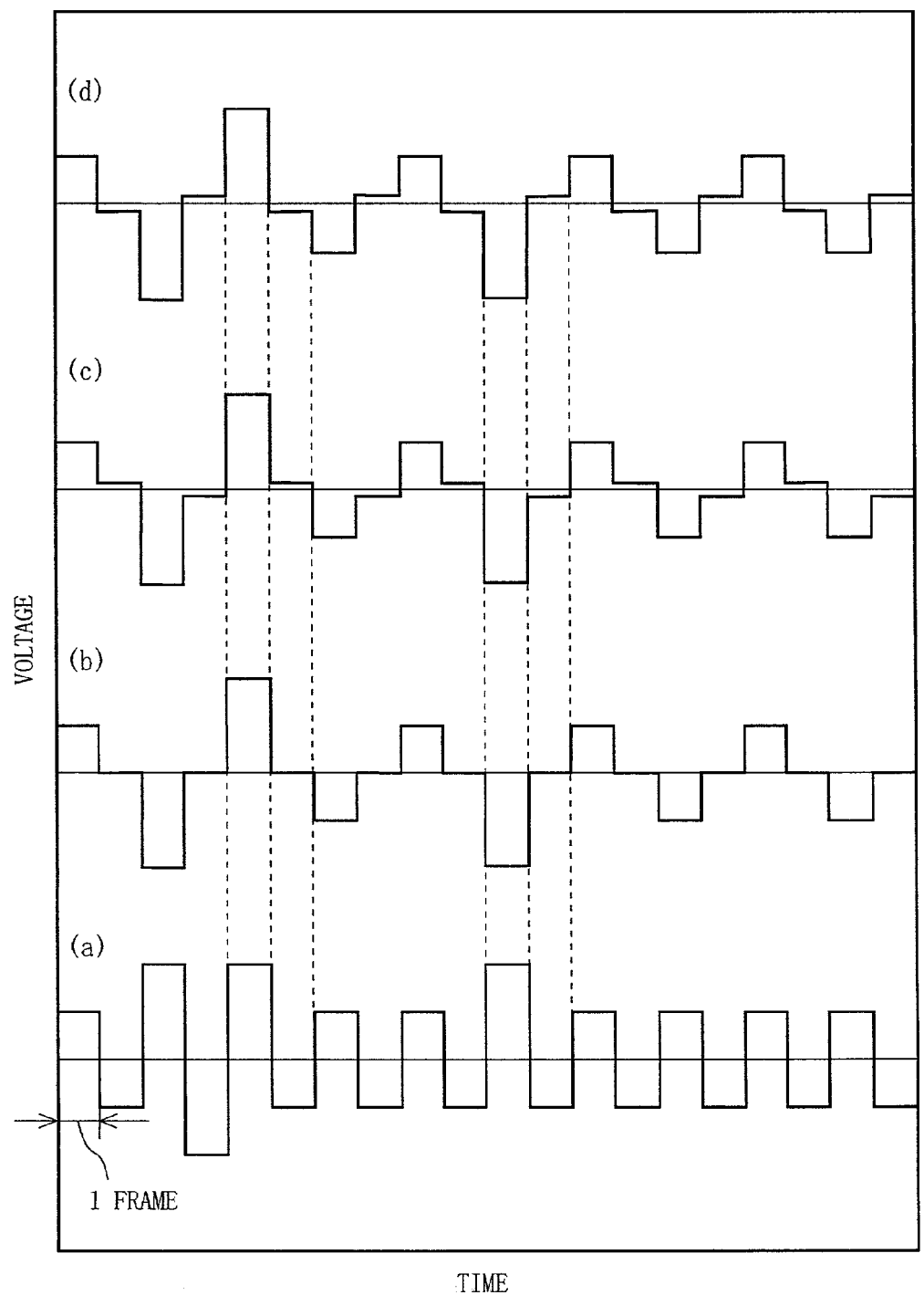
FIG. 21 is a diagram showing waveforms of a voltage to be applied to a pixel.

FIG. 21(a) shows an exemplary voltage application to a pixel under the conventional drive method. FIG. 21(b) shows another exemplary voltage application to a pixel under a drive method of the present embodiment. Here, in the above-described sixth embodiment, since signal application has to be done twice for a pixel in each frame, TFTs in the pixels and peripheral circuits may be limited in design. In the present embodiment, on the other hand, a signal voltage is applied to a pixel in the first frame, and a black video signal, i.e., a drive voltage of 0V, as a compensation signal for canceling uneven ion distribution, is applied to a pixel in the second frame. Thereafter, the polarity of the signal voltage is reversed for every two frames.

In the present embodiment, through such operation, uneven ion distribution which occurs as a result of the application of the drive voltage in the first frame can be cancelled by application of the black-level voltage in the second frame. Accordingly, uneven ion distribution is cancelled in two frames, resultantly suppressing the occurrence of the echo phenomenon.

Here, if the black voltage is applied to all of the pixels on the display screen at the same time, flicker occurs at a frequency half of that of the video signal. Thus, in order to prevent this, frame shifting is taken place in a one-to-one relationship to lines, columns, or dots. Assume here that the video signal is applied to even-numbered lines in an n-th frame, and the black-level signal is applied to odd-numbered lines therein. Then, in an n+1-th frame, the video signal is applied to odd-numbered lines, and the black-level signal is applied to even-numbered lines. If this is the case, the resolution in one frame of the screen is actually reduced to half, but because of the human eyes' accumulated effects, the resolution will be reduced to only about 25%. Presently, since video signals used for TVs and VTRs are often in the interlace format, with drive of the present invention in accordance with the respective format of the video signals, an interlace-progressive (IP) conversion circuit is not required, thereby reducing the cost of the resultant liquid crystal display apparatus. In this regard, the present embodiment is considered to be suitable for a case where input video signals are interlace signals.

Eighth Embodiment

Figure 22:
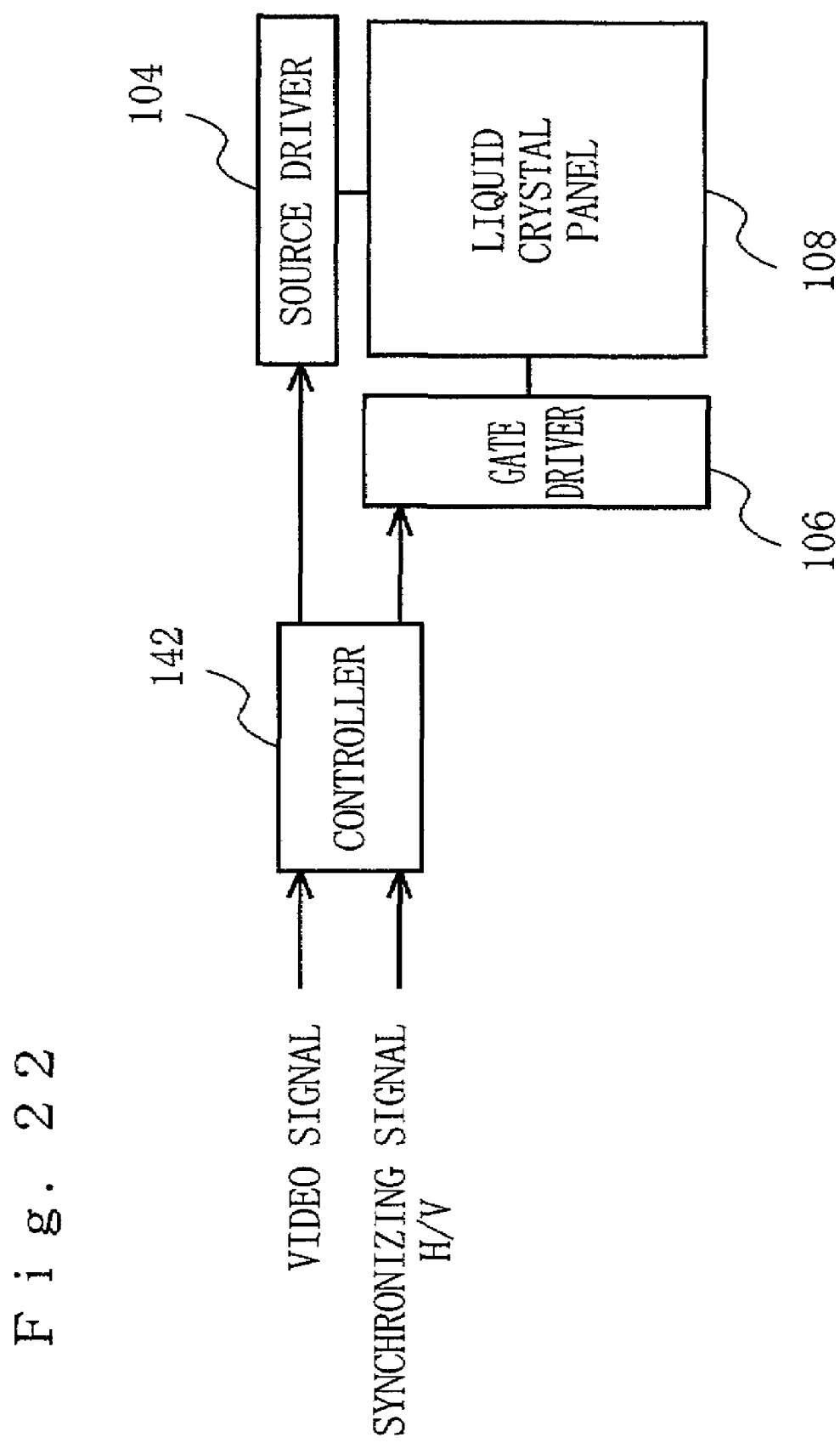
FIG. 22 is a block diagram showing the structure of a liquid crystal display apparatus according to an eighth embodiment of the present invention.

FIG. 22 shows the structure of a liquid crystal display apparatus according to an eighth embodiment of the present invention. Here, in FIG. 22, any constituent identical to that of FIG. 1 is provided with the same reference numeral, and is not described again. In the conventional liquid crystal display apparatus, the scanning lines have been sequentially scanned in order line by line. Conversely, in the present embodiment, the scanning lines are scanned every other line by a controller 142.

Figure 23:
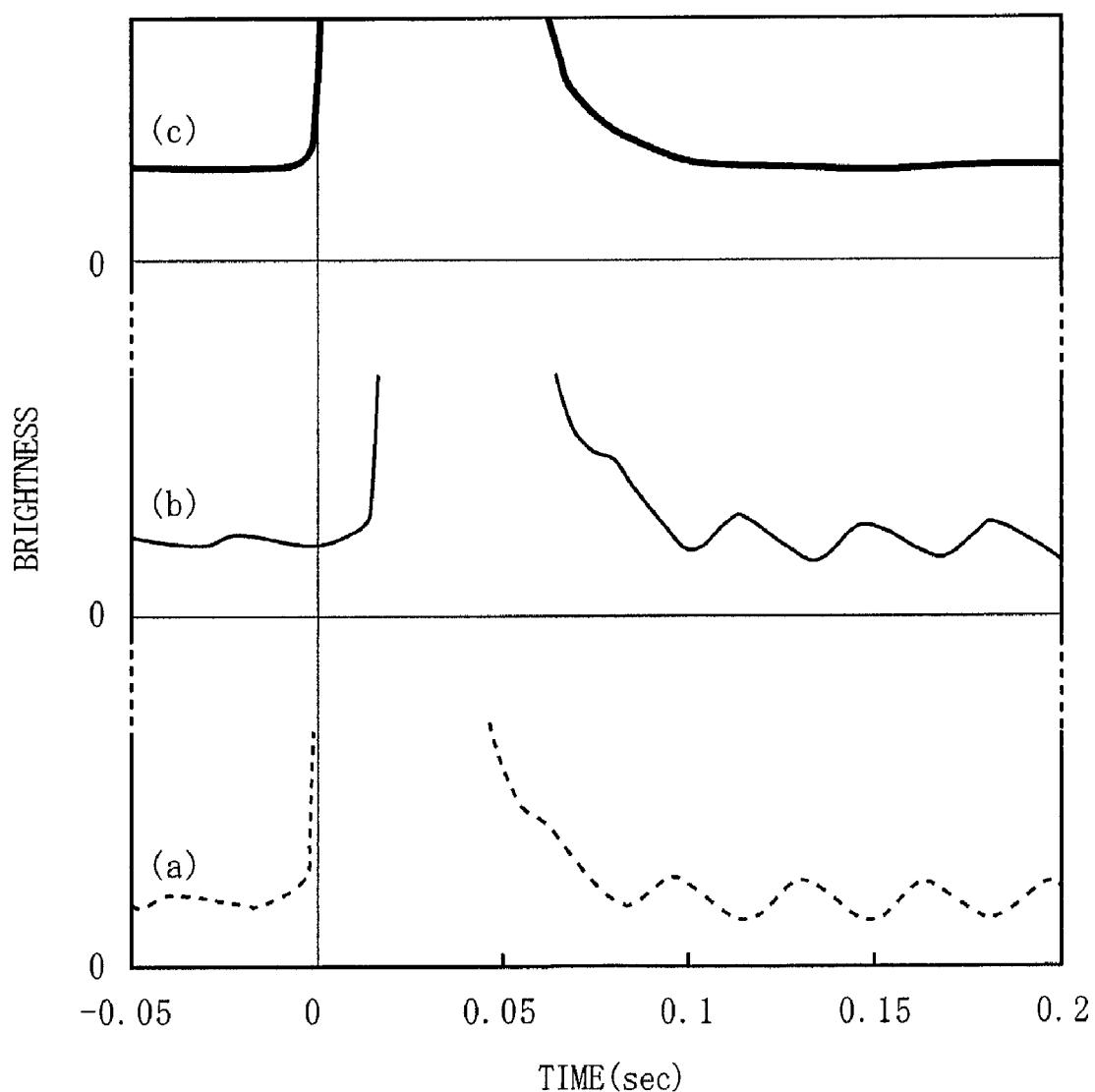
FIG. 23 is a diagram showing the change in brightness of any two pixels adjacent to each other.

FIG. 23(a) and FIG. 23(b) show a change in brightness that is observed in, respectively, any two pixels adjacent to each other in response to any Direct-Current component applied thereto. From FIG. 23(a) and FIG. 23(b) showing changes in brightness, it is known that the brightness starts to periodically vary after the DC voltage application, and the echo phenomenon is observed in both of those pixels.

However, under the drive method of the present embodiment, as shown in FIG. 23(a) and FIG. 23(b), the drive voltage waveform of the liquid crystal of those adjacent pixels is shifted by a half period. When a person sees such two pixels, his/her eyes may spatially average those, and recognize that as a change in brightness as shown in FIG. 23(c). Therefore, no echo phenomenon is to be observed.

Ninth Embodiment

Figure 24:
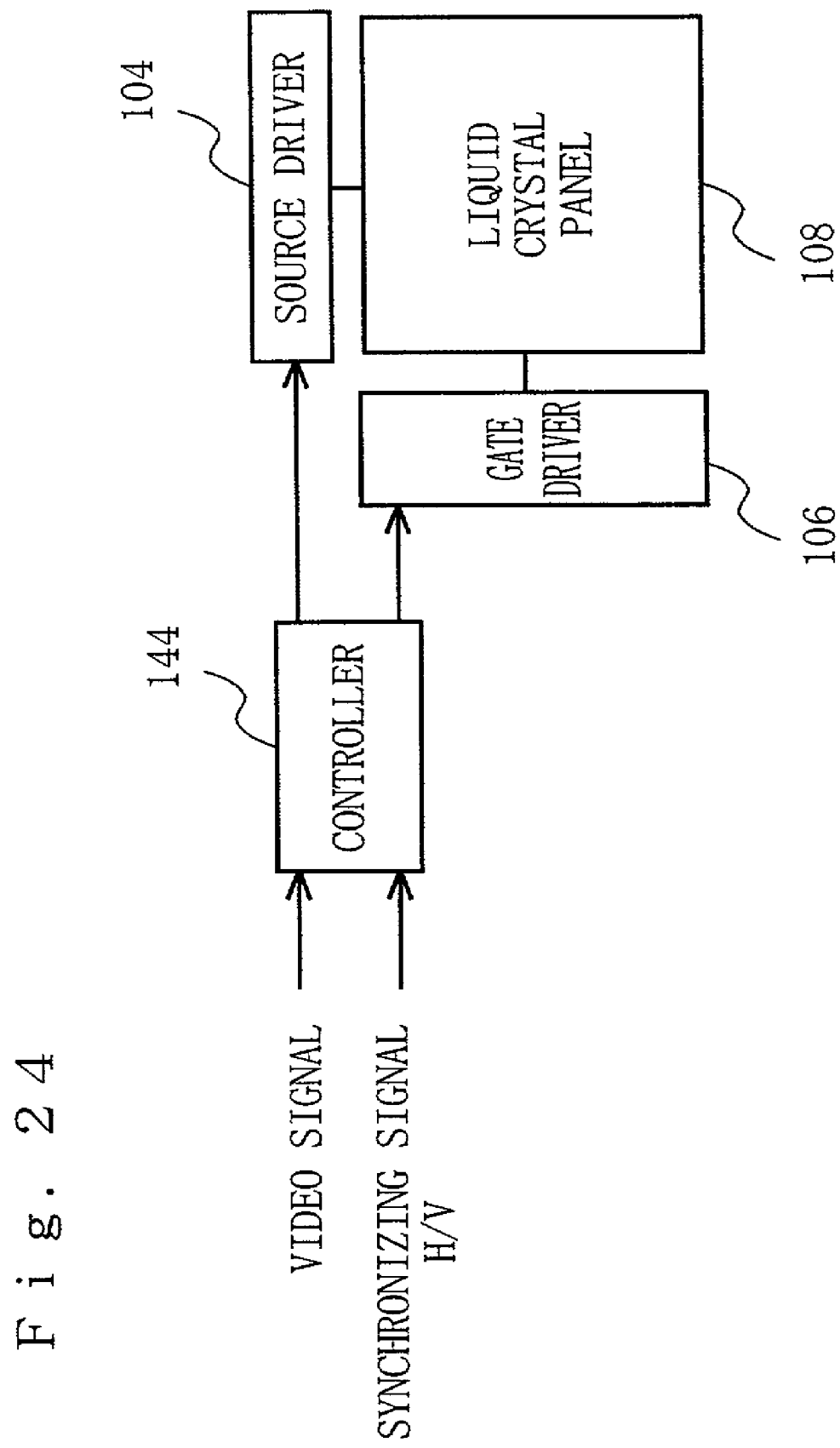
FIG. 24 is a block diagram showing the structure of a liquid crystal display apparatus according to a ninth embodiment of the present invention.

FIG. 24 shows the structure of a liquid crystal display apparatus according to a ninth embodiment of the present invention. Here, in FIG. 24, any constituent identical to that of FIG. 1 is provided with the same reference numeral, and is not described again. In the conventional liquid crystal display apparatus, the polarity of the drive voltage is set so as to alternate frame by frame. In the present embodiment, on the other hand, for the purpose of restraining the echo phenomenon, a controller 144 controls the drive voltage in such a manner that the polarity does not alternate once for n frames. Here, n is presumably 2 or larger.

Figure 25:
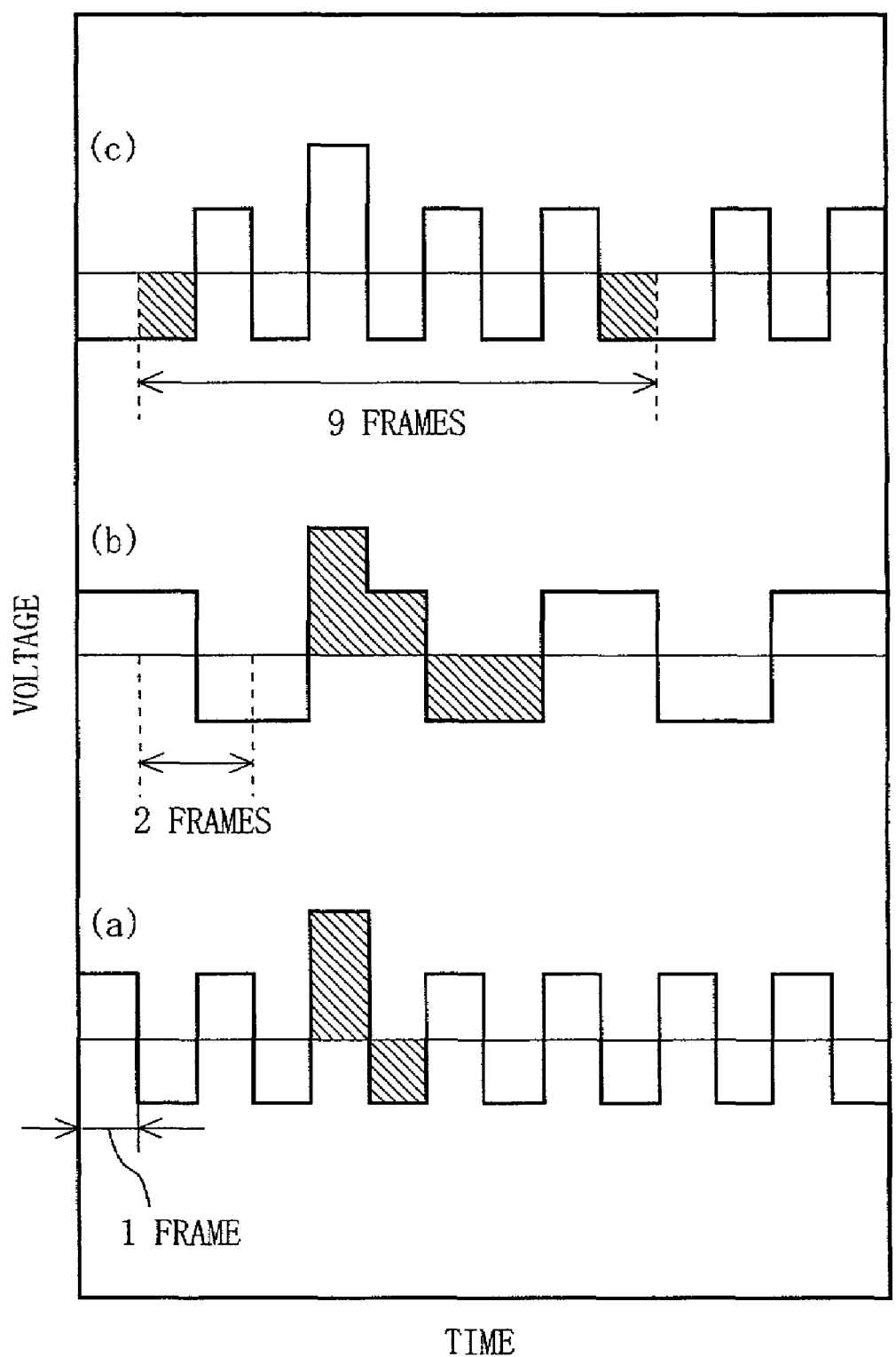
FIG. 25 is a diagram showing waveforms of a voltage to be applied to a pixel.

FIG. 25(a) is a diagram showing a change which is observed in the drive voltage applied to the liquid crystal of a focusing pixel in a case where the liquid crystal is driven under the conventional drive method. FIG. 25(b) is a diagram showing a change which is observed in the drive voltage of the liquid crystal of the focusing pixel in a case where the polarity of the drive voltage is not alternated once for every two frames. FIG. 25(c) is a diagram showing a change which is observed in the drive voltage applied to the liquid crystal of the focusing pixel in a case where the polarity of the drive voltage is not alternated once for every 9 frames.

As such, by setting the polarity of the drive voltage not to alternate once for n frames, it is confirmed that the echo phenomenon can be successfully restrained. This is because, with the conventional AC drive as shown in FIG. 25(a), the ratio between a positive part and a negative part both diagonally shaded therein is about 2:1, and when the polarity alternates for every two frames as shown in FIG. 25(b), the ratio between a positive part and a negative part both diagonally shaded therein is about 3:2. In view of the comparison result derived by those shaded parts, the latter is considered to be better balanced. Further, as shown in FIG. 25(c), the echo phenomenon is also confirmed as being restrained when the polarity is set so as not to alternate once for nine frames. In this case, if any one of the nine frames except for those shaded in FIG. 25(c) is conspicuously high in voltage as the 5th frame shown in FIG. 25(a), an echo phenomenon occurs due to the voltage of higher level but is definitely restrained as compared with the case under the conventional AC drive. If such a voltage of higher level is found in the shaded frame(s) shown in FIG. 25(c), however, an echo phenomenon is problematically encouraged to occur as compared with the case under the conventional AC drive. As shown in FIG. 25(c), however, the shaded parts occupy no more than $2/9$ as a whole. Therefore, even if an input signal pattern shows one frame which is conspicuously high in voltage, the probability of the voltage of the higher level applying to those shaded parts, that is, the successive frames of the same polarity is merely $2/9$. Accordingly, in terms of the probability theory, an echo phenomenon is successfully suppressed. Here, in FIG. 25(c), the polarity of the drive voltage does not alternate once for nine frames, but this is not restrictive.

As described in the above, according to the ninth embodiment, there is only a need to change the timing for polarity reverse of the drive voltage. Accordingly, the echo phenomenon can be suppressed quite easily.

Tenth Embodiment

Figure 26:
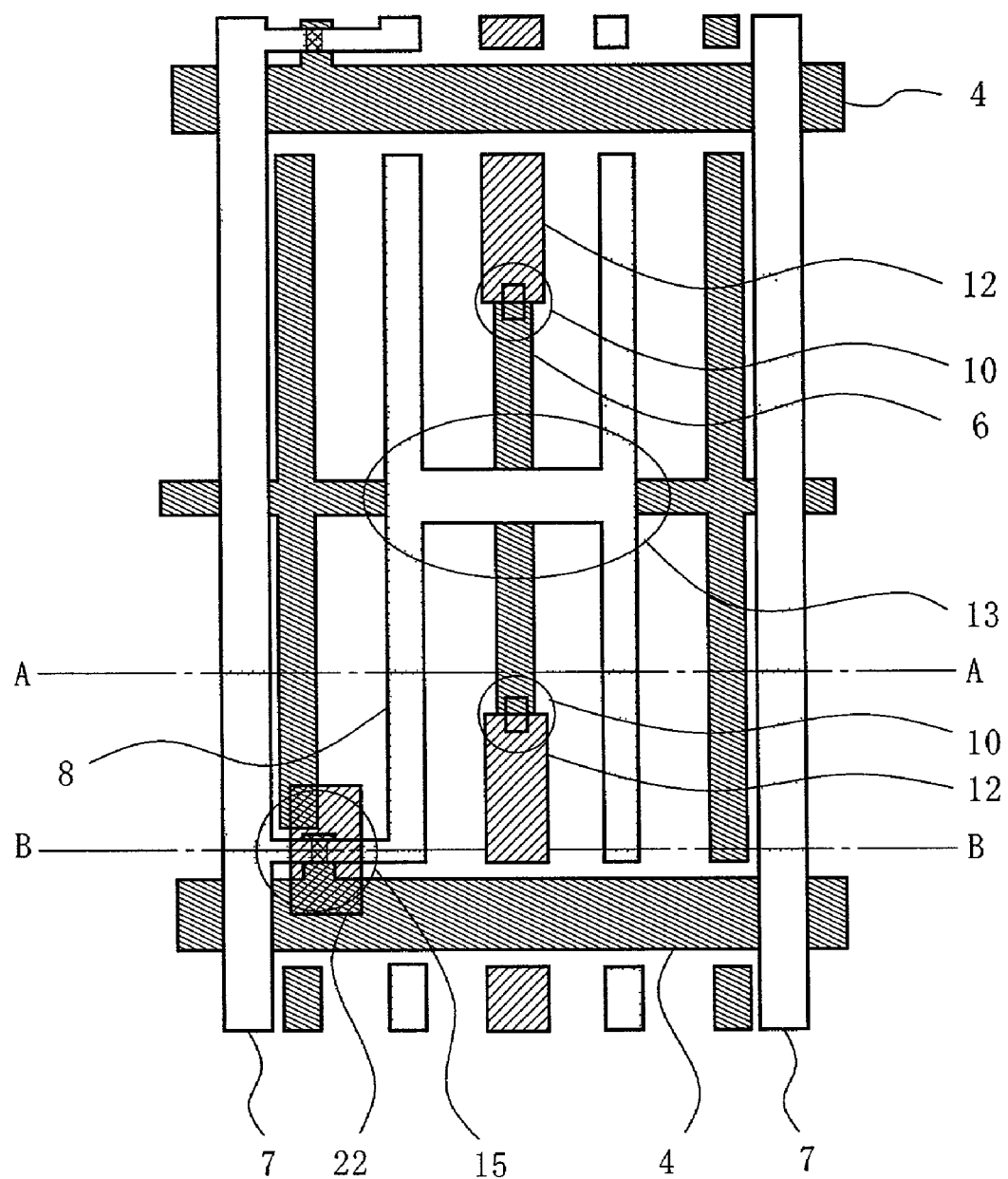
FIG. 26 is a top view of the structure of a liquid crystal panel according to a tenth embodiment of the present invention.

FIG. 26 shows a top view of a unit pixel of a liquid crystal panel according to a tenth embodiment of the present invention. In the present embodiment, in order to ease uneven ion distribution, a pixel electrode and a common electrode apply the voltage to the liquid crystal only through an orientation film. FIG. 27(a) is a section view along B—B shown in FIG. 26. FIG. 27(b) is a section view along A—A shown in FIG. 26. With such a structure, according to the present embodiment, ion distribution in the liquid crystal will not become so uneven as compared with the general IPS-type liquid crystal panel shown in FIG. 2 and FIG. 3. A further description is given below. It should be noted here that the structures shown in FIG. 26 and FIG. 27 are not more than a specific example, and are not restrictive.

On the glass substrate 1 which is a part of the liquid crystal panel, as metal leads, the video signal line (source line) 7 and the scanning signal line (gate line) 4 are placed in a matrix. At each intersection point of these signal lines, a TFT (Thin Film Transistor) 15 is formed as a switching element. On the glass substrate 1, the gate electrode 4 and the common electrodes 5 and 6 made of metal such as Al are formed simultaneously. Next, the first insulator film 20 (interlayer insulator film) is formed, and then a semiconductor film (amorphous silicon layer) and a protection layer of the transistor are sequentially formed. Then, the first insulator film 20 is removed from a part not including the display part but being in the vicinity thereof so that contact with the lead part becomes possible. At the same time, the first insulator film 20 on the common electrode in the pixel is partially removed, and thus a contact hole is formed.

Then, by using metal such as Al/Ti, another signal lead (source line) 7, the drain line 14, the pixel electrodes 8 and 9, and a second common electrode 12 are formed. At this time, the second common electrode 12 is electrically connected to the first common electrode 5 via the contact hole 10. Here, the first common electrode 5, the second common electrode 12, and the contact hole 10 are not specifically limited in placement position. Here, by placing the first common electrode farther from the gate wiring, shorts between the gate wiring and the common electrodes can be prevented.

In order to protect the TFT formed as described above on the substrate, SiNx is formed as the second insulator film (passivation film) 22. The second insulator film 22 on a terminal part by which an electrical signal for the part around the display area but not including the same is applied is removed, and the second insulator film 22 is also removed from the rest of the part excluding the TFTs in the pixel.

With such a structure, in the present embodiment, no echo phenomenon occurs when displaying moving images. As shown in FIG. 27(*a*) and FIG. 27(*b*), inorganic insulator films over the pixel electrodes and the common electrodes have been removed, and thus, the pixel electrodes and the common electrodes apply the voltage to the liquid crystal via only the orientation film. Therefore, even if ions get distributed unevenly, such unevenly distributed ions become non-ionic as they are recovered by the pixel electrodes and the common electrodes.

Note that, in the present embodiment, both of the pixel electrode and the common electrode are abutting to the liquid crystal only through the orientation film, but this is not restrictive. If at least a part of the pixel electrode and the common electrode is structured so as to apply the voltage to the above-described liquid crystal only through the above-described orientation film, uneven ion distribution is accordingly eased and the echo phenomenon is suppressed. That is, such a structure will do as, in the unit pixel, at least a part of the pixel electrode and the common electrode are structured so as to apply the voltage to the liquid crystal only through the orientation film.

Eleventh Embodiment

As an eleventh embodiment of the present invention, the structure of a liquid crystal panel in which ions hardly get unevenly distributed is described.

Figure 28:
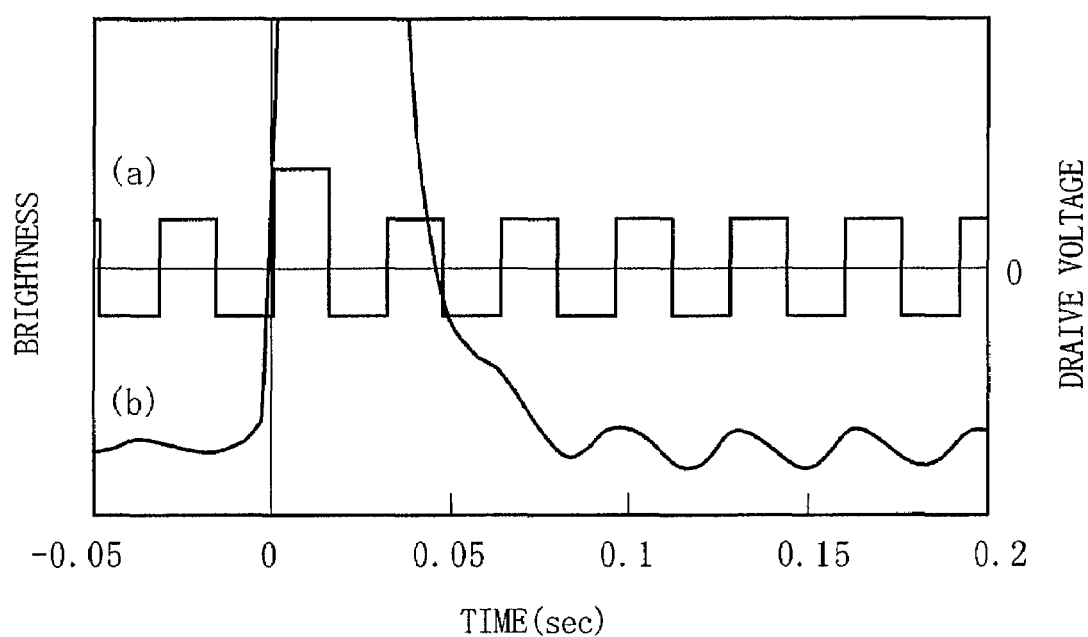
FIG. 28 is a diagram illustrating how an echo phenomenon occurs in the liquid crystal panel 108.
Figure 31:
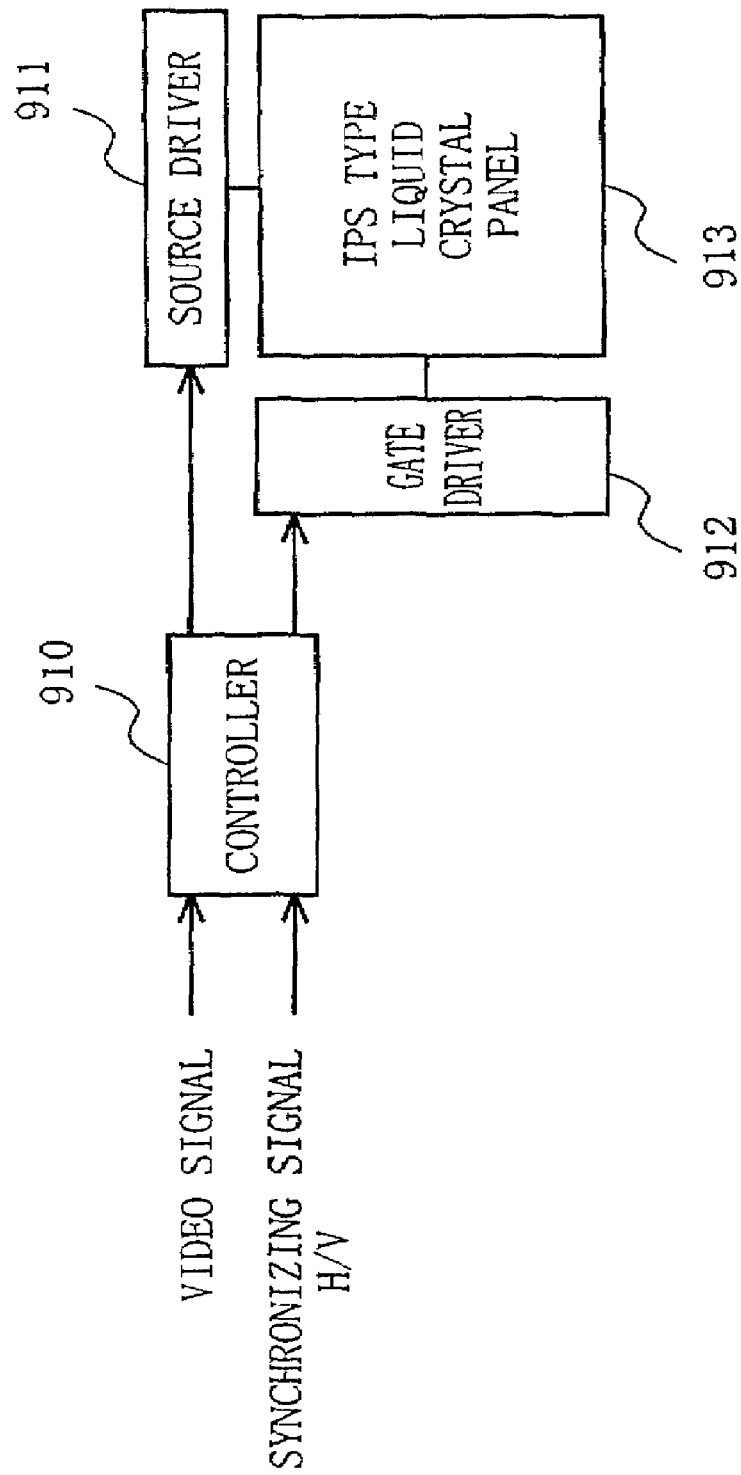
FIG. 31 is a block diagram showing the structure of a conventional liquid crystal display apparatus.
Figure 32:
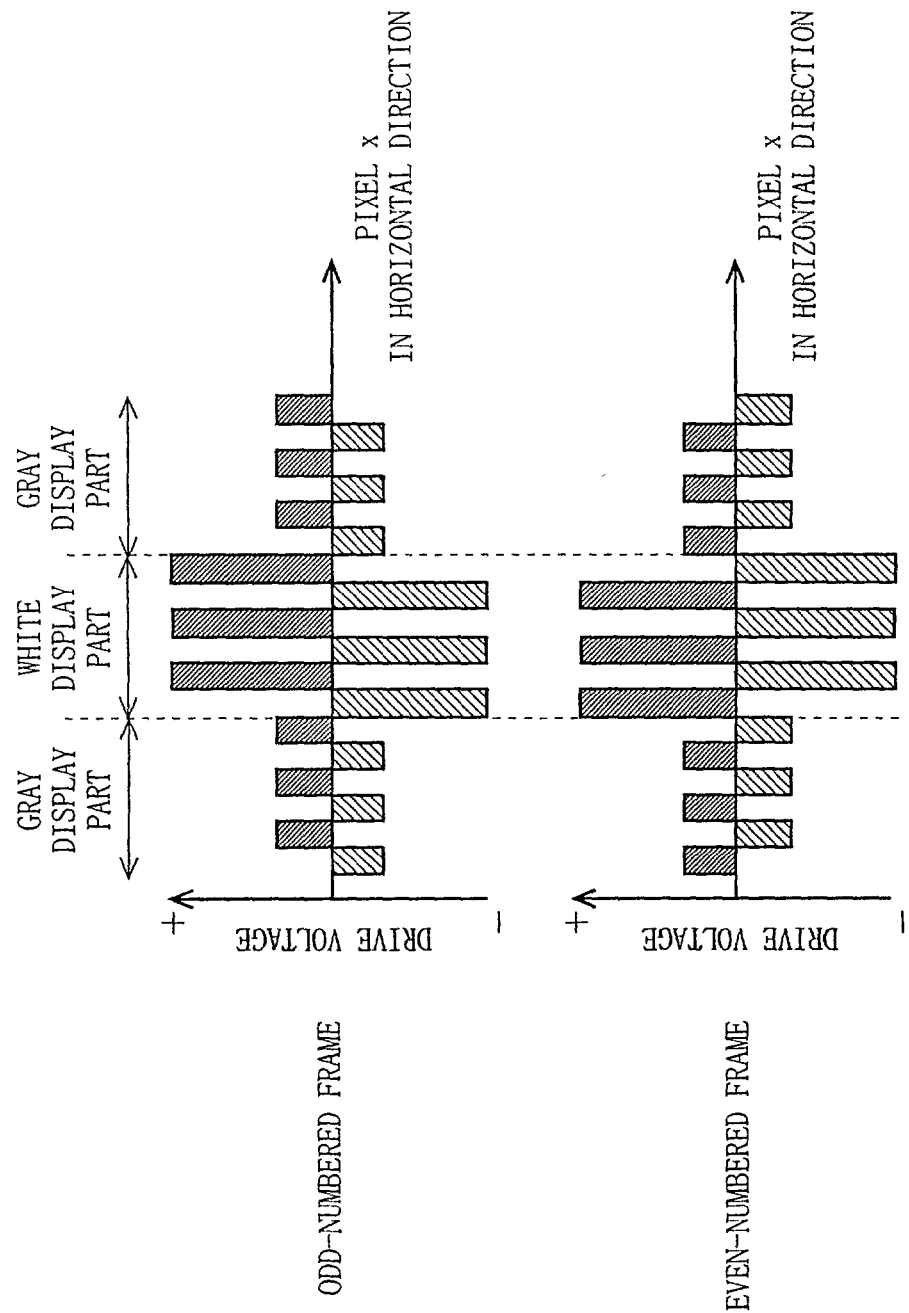
FIG. 32 is a diagram showing waveforms of a drive voltage when a test pattern of still images showing gray, white, and gray in the horizontal direction is displayed under a conventional alternating-current drive method.
Figure 34:
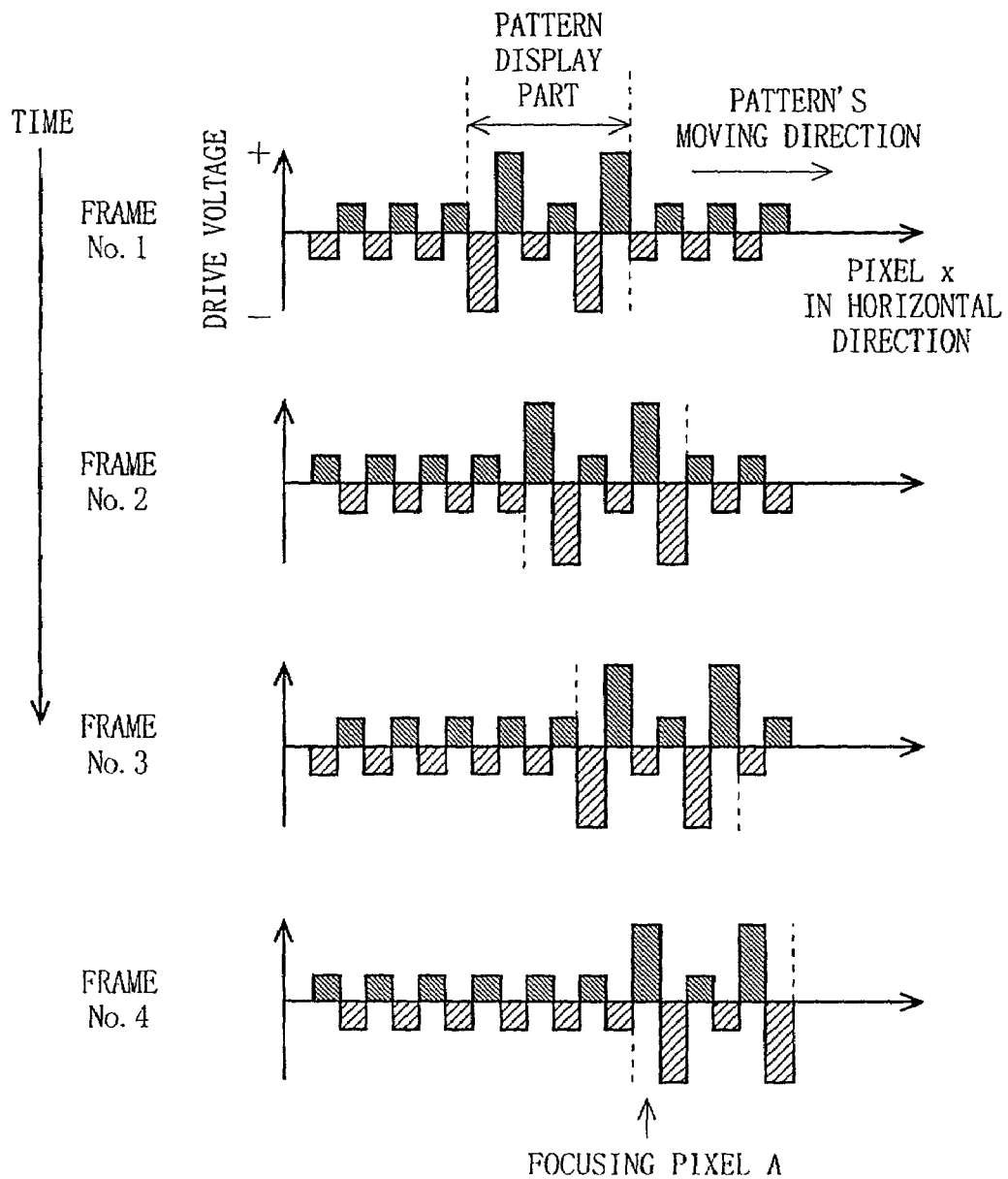
FIG. 34 is a diagram showing drive voltage waveforms, in the conventional liquid crystal display apparatus including the IPS-type liquid crystal panel, in a case where a test pattern of white, gray, and white is moved rightward by two pixels on a frame basis.
Figure 35:
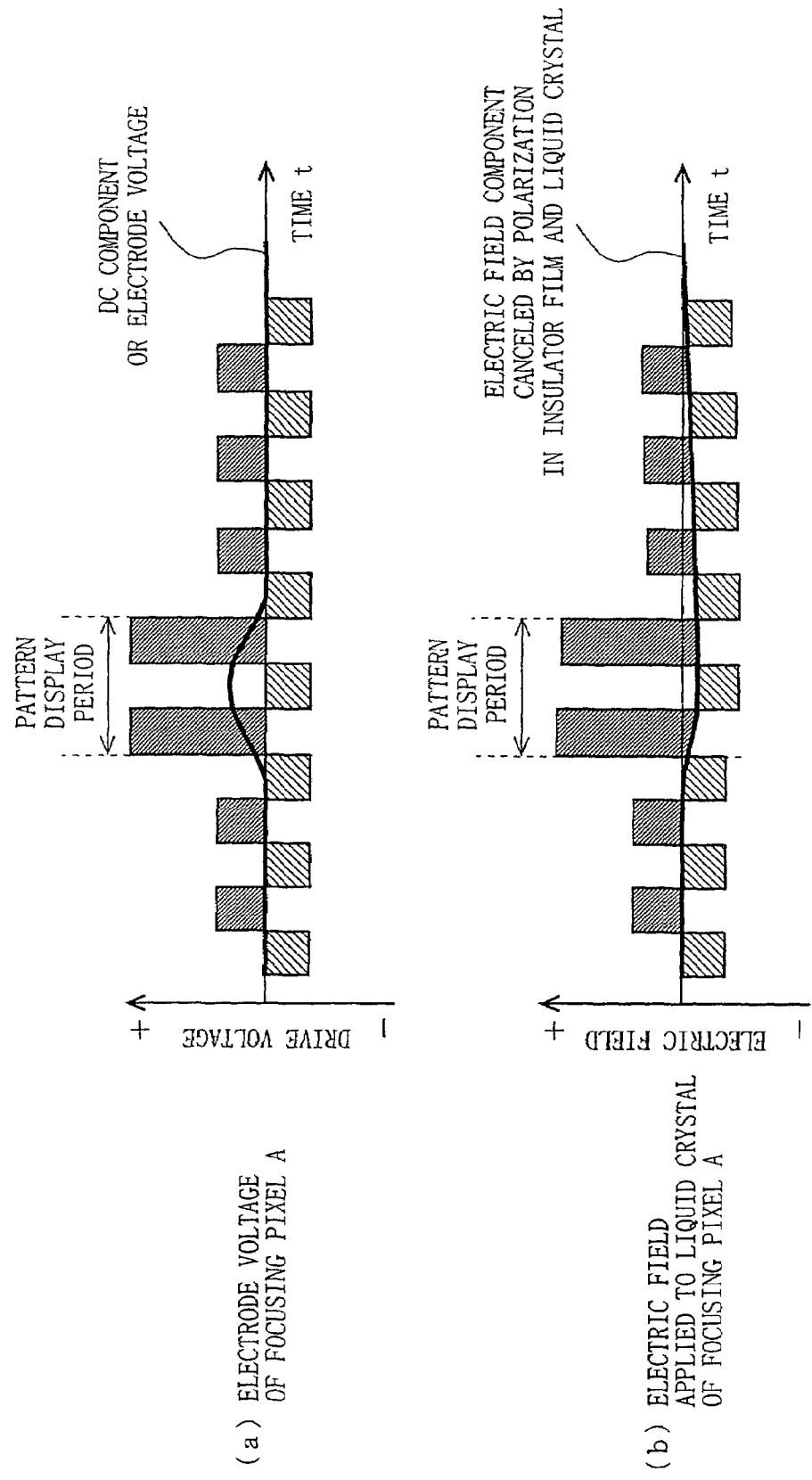
FIGS. 35(a) and (b) are diagrams showing an electrode voltage of a focusing pixel A shown in FIG. 34, and an electric field relating to the focusing pixel A.
Figure 36:
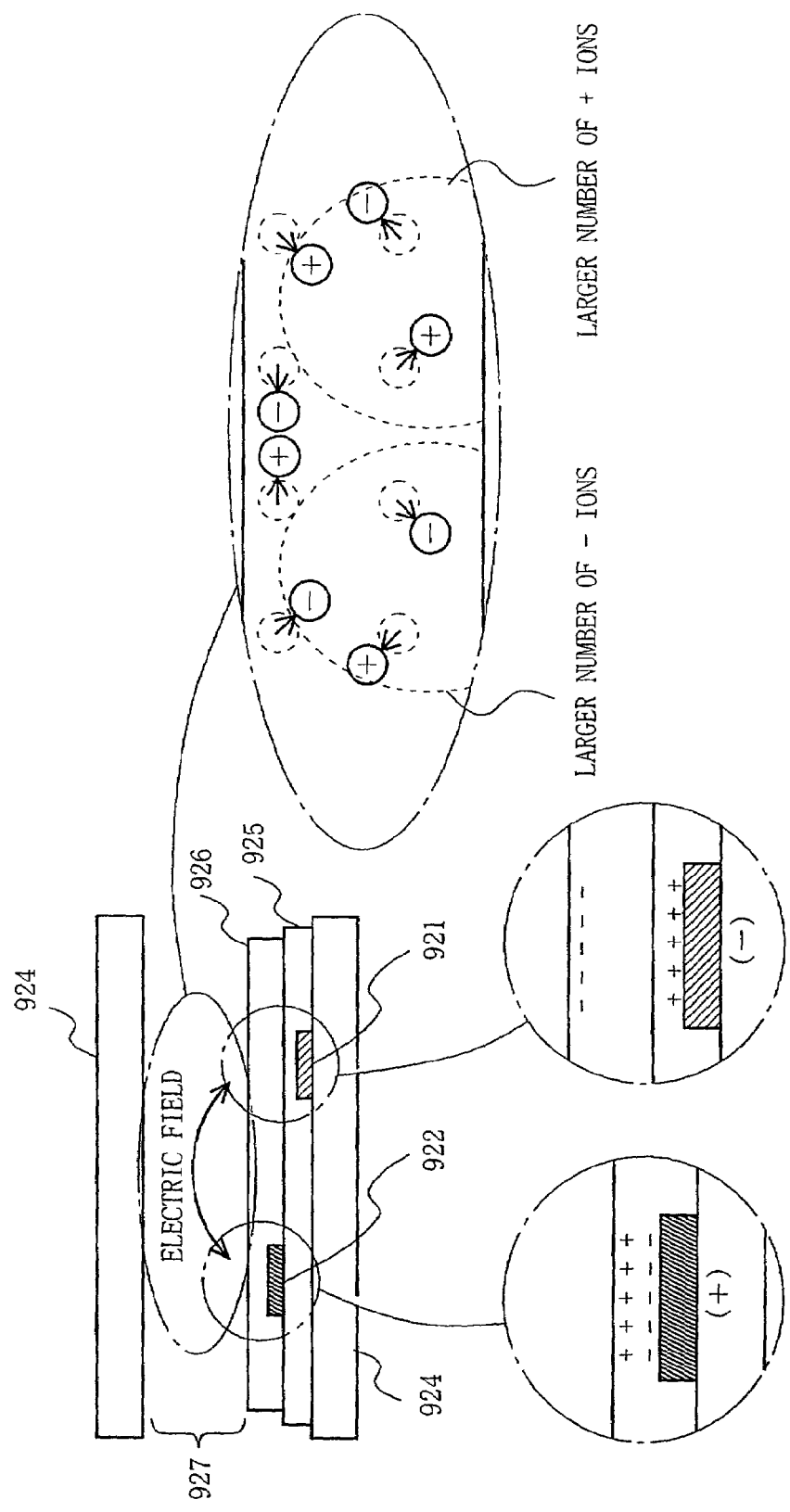
FIG. 36 is a diagram showing polarization that occurs in an insulation film and uneven distribution of ions in the liquid crystal as a result of DC voltage application in the IPS-type liquid crystal panel, (−) to a common electrode 921, and (+) to a drain electrode 922.
Figure 37:
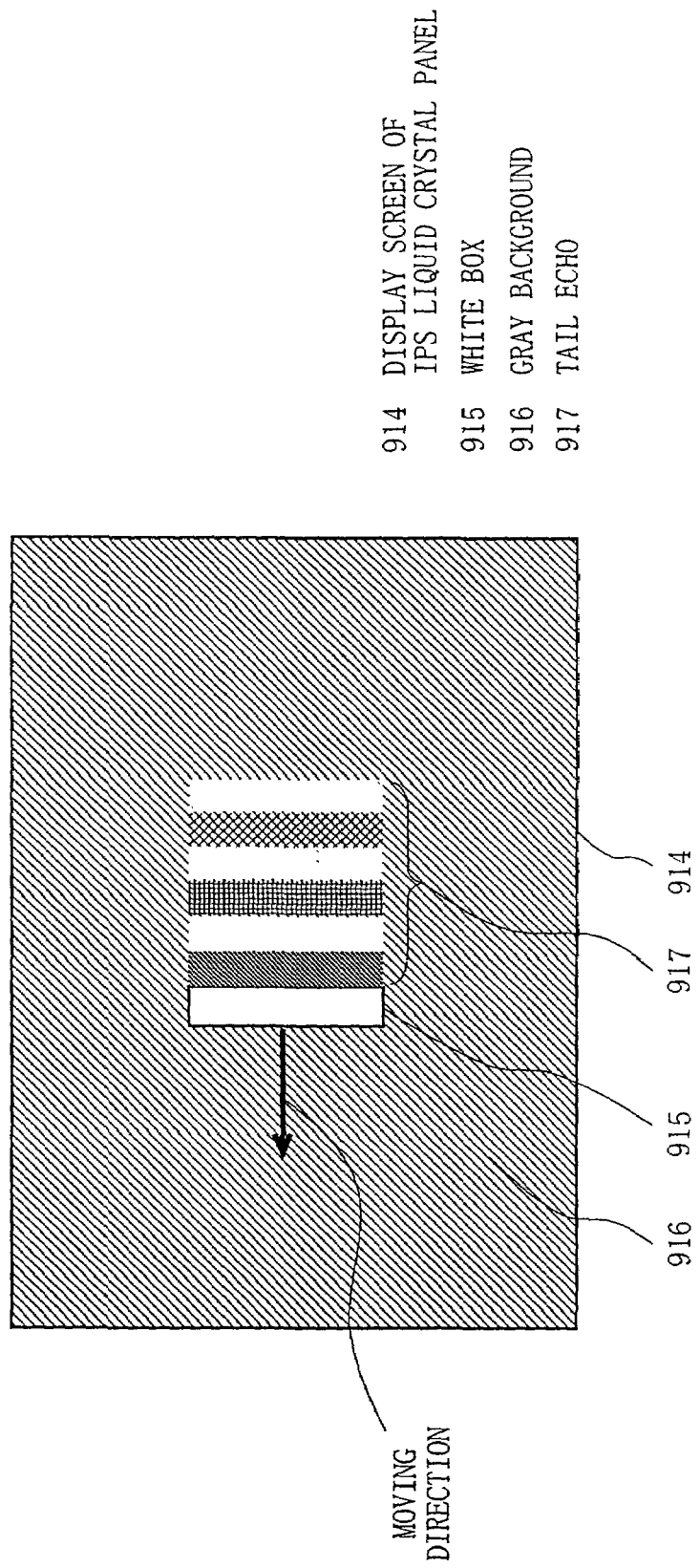
FIG. 37 is a diagram showing an exemplary image display when a test pattern is moved leftward in the conventional liquid crystal display apparatus.
Figure 38:
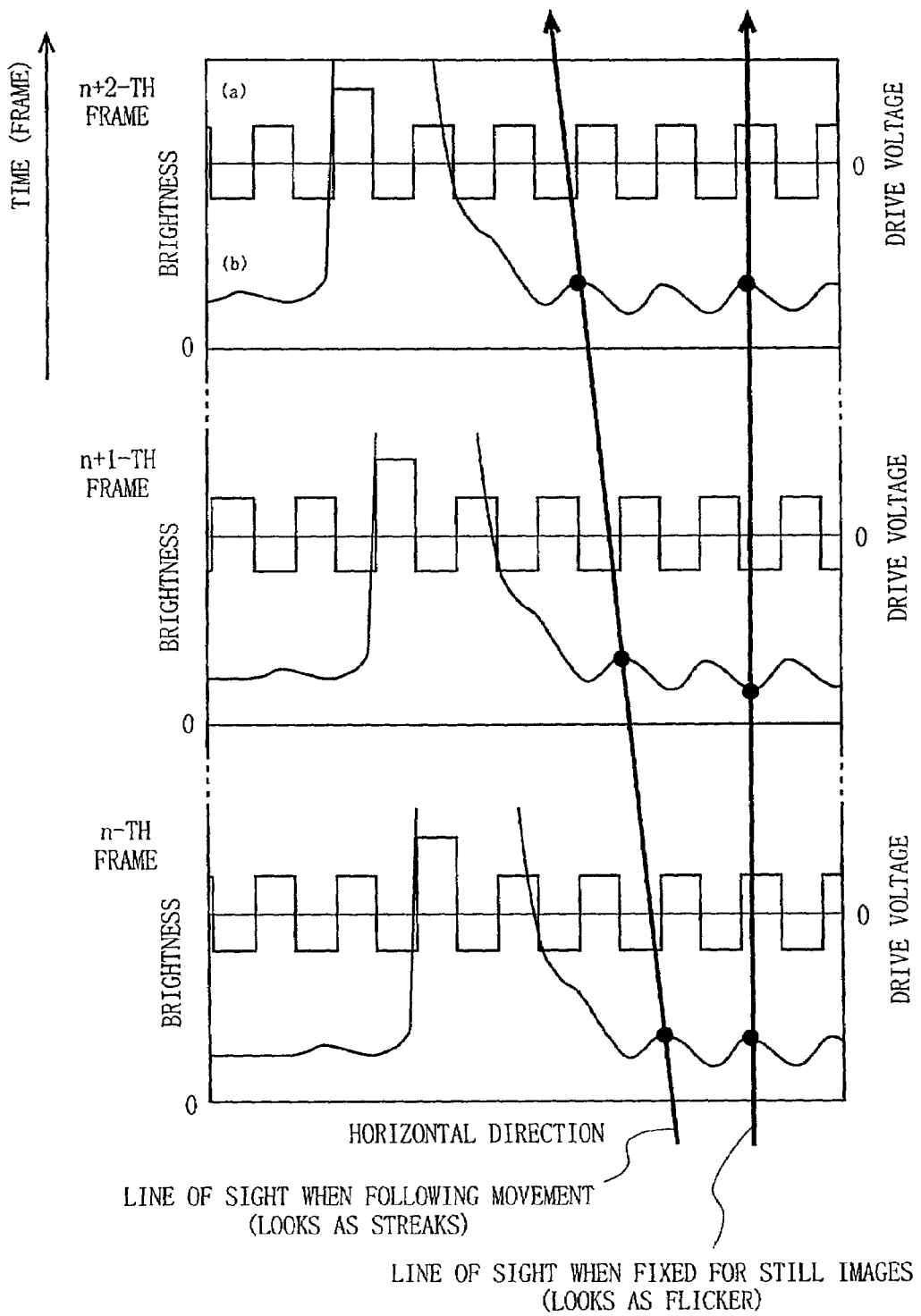
FIG. 38 is a diagram for illustrating how echo streaks occur in the conventional liquid crystal display apparatus.

For reference purpose, FIG. 28(*a*) and FIG. 28(*b*) show a change in brightness when a Direct-Current component is applied to a pixel of the general IPS-type liquid crystal panel 108 shown in FIG. 2, and FIG. 3(*a*) to FIG. 3(*c*). FIG. 28(*a*) shows a voltage level to be applied to the pixel, and FIG. 28(*b*) shows a change in brightness when a voltage applied thereto is of the voltage level. In the liquid crystal panel 108, the brightness periodically varies as shown in FIG. 28(*b*), and as a result, an echo phenomenon is observed.

Here, as to the material structuring the liquid crystal panel, as shown in FIG. 29, the echo phenomenon is found to be observed in any of a liquid crystal panel using liquid crystal which includes 1% or more of a CN compound, a liquid crystal panel using a polyimide orientation film (low-resistance orientation film) which includes the following compound whose conjugated length is seven or more atoms, a liquid crystal panel using liquid crystal to which such an additive as ionic compound is added, and a liquid crystal panel in which the volume of ions in liquid crystal is increased by irradiating UV ray to the liquid crystal, for example.

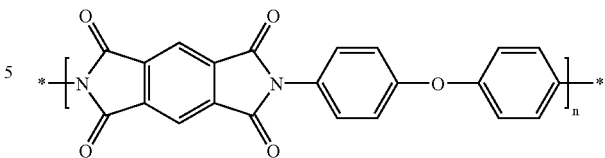

Herein, an IPS-system is exemplified for comparison purpose, but any other liquid crystal modes may lead to the same phenomenon. Also, this array substrate structure is not restrictive, and this structure is no more than an exemplary one for comparison.

The liquid crystal panel of the present embodiment is the same as the liquid crystal panel 108 shown in FIG. 2 and others except for the liquid crystal and the orientation film material. The liquid crystal used in the present embodiment is the one including no CN compound, and the orientation film is a polyimide high-resistance orientation film including no such compound as having the conjugated length of seven or more atoms, but including the following compound.

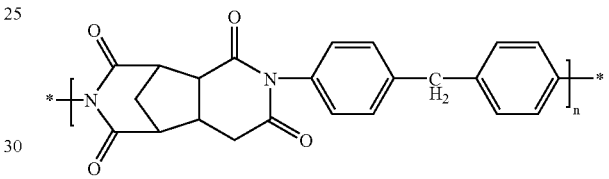

By taking liquid crystal which are panels each manufactured by arbitrarily combining liquid crystal A to B varying in type, and orientation films A to C all satisfying such conditions, as shown in FIG. 30, a voltage holding ratio at 40 degrees is 98% or more, and the ion density will be $1 \times 10^{-8}$ MOl cm$^{-3}$ or lower, proving that no echo phenomenon occurs when moving images are displayed.

As such, according to the liquid crystal panel of the present embodiment, the material to be used therefor has the smaller number of impurity ions in the liquid crystal and the orientation film, and is high in resistance. Therefore, no echo phenomenon occurs.

Here, even if no echo phenomenon occurs, due to slow response speed, a tail phenomenon inconveniently occurs when displaying moving images. Accordingly, in view of the response speed, the guideline for property constants of the liquid crystal material is described below.

The following equation (1) is an equation relating to the response speed (τ r) at a rising edge, equation (2) is an equation relating to the speed (τ d) of a falling edge, and equation (3) is an equation relating to the voltage of the rising edge.

$$\tau_r = \frac{\gamma}{\varepsilon 0 \times \Delta_\varepsilon (V/L)^2 - K\pi^2/d^2} \quad (1)$$

$$\tau_d = \frac{\gamma d^2}{K\pi^2} \quad (2)$$

$$Vth = \frac{\pi 1}{d}\sqrt{\frac{K}{\varepsilon 0 \times \Delta_\varepsilon}} \quad (3)$$

Here, in the equation (1), the equation (2), and the equation (3), γ denotes a rotational viscosity, K denotes an elastic constant, I denotes a space between electrodes, V denotes a voltage, and d denotes a gap.

The response speed is preferably 1 ms or smaller, practically the response speed is 40 ms or smaller since τr+τd, and preferably the response speed is 30 ms or smaller. As is evident from the equation (1) and the equation (2), the smaller γ will increase the response speed. The problem is that reducing γ without using the liquid crystal including CN group is considerably difficult under present circumstances. Thus, instead, try to reduce d to increase the response speed. In order to reduce d, there needs to be an increase Δn. If the drive voltage between the pixel electrode and the common electrode has any allowance, Δ∈ may be small in value. Accordingly, the guideline for designing the liquid crystal material is to set Δn as large as possible, and γ as small as possible within a range not affecting the characteristics (especially reliability) of the liquid crystal display apparatus.

To be specific, γ preferably takes a value in the range of 100 to 140 mPa·s (preferably 120 or smaller, but 130 to 140 under present circumstances), Δn in the range of 0.9 to 1.2 (preferably 1.1 or larger), and Δ∈ in the range of 6 to 12 (when the drive voltage is 7.5V or lower, preferably 9 or larger. When the drive voltage is 10V or higher, Δ∈ may be in the range of 6 to 10).

Here, since the property constants of the liquid crystal material such as Δn, Δ∈, and γ correlate to one another, they can be realized by mixing various types of liquid crystal, the compound and the composition of which are not specifically limited.

In the above, various embodiments of the present invention are described, and by arbitrarily combining those according to conditions relating to the panel structure, the material, the drive, and the peripheral circuits, the echo phenomenon can be suppressed at lower cots.

Here, the liquid crystal display apparatus is described above in the various embodiments, but in any display device for driving pixels with AC drive may also cause an echo phenomenon similar to the one occurring in the liquid crystal display apparatus. In this point of view, the present invention is not limitedly applicable only to the liquid crystal display apparatus, but is widely applicable to any display devices operating under AC drive.

INDUSTRIAL APPLICABILITY

As described above, in accordance with the present invention, an echo phenomenon can be prevented and moving image display with higher quality can be realized even in display devices varying in type typified by liquid crystal display apparatuses which occur the echo phenomenon when displaying moving images, and degrade those when displayed.

The invention claimed is:

1. An image display apparatus for displaying an image based on an input video signal, said image display apparatus comprising:
   a display device for outputting image lights according to a voltage to be applied;
   a drive unit for driving said display device by switching a drive voltage applied across a pixel liquid crystal between positive and negative for application based on the input video signal; and
   a suppression unit for suppressing a polarization phenomenon in said display device,
   wherein said suppression unit is operable to correct, when the input video signal having different levels is inputted in two successive frames to which the drive voltage having different polarities is applied, the input video signal in at least one of the two successive frames so as to make a difference of absolute values of the drive voltage of the two successive frames to be no greater than ½ of a maximum drive voltage; and wherein the input video signal includes moving images.

2. The image display apparatus according to claim 1, wherein when an absolute value of a level of the input video signal in an n-th frame of a signal being normal to the input video signal is different from an absolute value of the level of the input video signal in an n+1-th frame or in an n−1-th frame, said suppression unit is operable to correct the input video signal of any one of the n+1-th frame, the n−1-th frame, or the n-th frame.

3. The image display apparatus according to claim 2, wherein said suppression unit is operable to correct the input video signals of both the n+1-th frame and the n−1-th frame.

4. The image display apparatus according to claim 2, wherein when correcting the input video signal of at least any one of the n+1-th frame, the n−1-th frame and the n-th frame, said suppression unit is operable to hold a maximum value or a minimum value of the level of the input video signal of the n+1-th frame, the n−1-th frame, and the n-th frame.

5. The image display apparatus according to claim 2, wherein when correcting the input video signal of at least any one of the n+1-th frame, the n−1-th frame, and the n-th frame, said suppression unit is operable to hold a sum of the absolute values or a square sum of the absolute values of the level of the input video signal of the n+1-th frame, the n−1-th frame, and the n-th frame.

6. The image display apparatus according to claim 1, wherein said suppression unit is operable to correct the input video signal of at least one of the two successive frames to make the difference of the absolute values of the drive voltage to be ¹⁄₁₀ of the maximum drive voltage or smaller.

7. The image display apparatus according to claim 6, wherein said suppression unit is operable to correct the input video signal of at least one of the two successive frames when, prior to correction, the difference of the absolute values of the drive voltage is exceeding ¹⁄₁₀ of the maximum drive voltage.

8. The image display apparatus according to claim 1, wherein said drive unit is operable to divide one vertical scanning period of the input video signal into a first sub period and a second sub period, output the input video signal in the first sub period, and output a comparison signal in the second sub period.

9. The image display apparatus according to claim 8, wherein the second sub period is shorter than the first sub period.

10. The image display apparatus according to claim 8, wherein the drive voltage in the second sub period is a voltage of a pedestal level or lower when said display device is a normally black type, and is a voltage of the pedestal level or higher when said display device is a normally white type.

11. The image display apparatus according to claim 10, wherein said display device is a normally black type, and the drive voltage in the second sub period is 0V.

12. The image display apparatus according to claim 8, wherein the drive voltage in the second sub period is applied to a plurality of scanning lines at one time.

13. The image display apparatus according to claim 1, wherein said drive unit is operable to scan, in an n-th frame, odd-numbered scanning lines for a data signal, and even-numbered scanning lines for a compensation signal, and scan, in an n+1-th frame, the odd-numbered scanning lines for the compensation signal, and the even-numbered lines for the data signal.

14. The image display apparatus according to claim 1, wherein during one vertical scanning period of the input video signal, after sequentially scanning either one of odd-numbered scanning lines and even-numbered scanning lines, said drive unit is operable to sequentially scan the scanning lines.

15. The image display apparatus according to claim 1, wherein said drive unit is operable to apply the drive voltage of the same polarity without polarity reverse to at least any two successive frames.

16. The image display apparatus according to claim 15, wherein said drive unit is operable to apply a drive voltage that alternates the polarity for every two frames.

17. The image display apparatus according to claim 15, wherein said drive unit is operable to apply the drive voltage of the same polarity between any two successive frames once for every n frames.

18. The image display apparatus according to claim 1, wherein said display device includes:

liquid crystal; and an orientation film; and wherein a combination of said liquid crystal and said orientation film is a combination to make a voltage holding ratio 98% or higher.

19. The image display apparatus according to claim 1, wherein said display device includes:

liquid crystal; and an orientation film; and wherein as said suppression unit, said liquid crystal includes no more than 1% in weight of a cyano group compound, and said orientation film does not include a high polymer whose conjugated length is seven atoms or more.

20. The image display apparatus according to claim 1, wherein said display device includes:

liquid crystal;

an orientation film; and a pixel electrode and a common electrode for applying the drive voltage to said liquid crystal; and wherein at least a part of said pixel electrode and said common electrode applies the drive voltage to said liquid crystal only via said orientation film.

21. The image display apparatus according to claim 1, wherein said display device includes:

liquid crystal; and an electrode for applying the voltage to said liquid crystal; and wherein a part of said liquid crystal is driven in a state in which there is none of said electrode in the vicinity thereof.

22. The image display apparatus according to claim 1, wherein said display device includes:

liquid crystal; and a pixel electrode and a common electrode for applying the voltage to said liquid crystal; and wherein said liquid crystal is driven by an electric field which is generated between said pixel electrode and said common electrode, and is almost parallel to a substrate.

23. The image display apparatus according to claim 1, wherein said display device is comprised of a plurality of materials, wherein at least one of the materials is a material with which an echo phenomenon easily occurs.

24. An image display method for displaying an image by driving a display device based on an input video signal, said method comprising:

driving the display device by switching a drive voltage applied across a pixel liquid crystal between positive and negative for application based on the input video signal; and suppressing a polarization phenomenon in the display device by correcting, when the input video signal having different levels is inputted in two successive frames to which the drive voltage having different polarities is applied, the input video signal in at least one of the two successive frames so as to make a difference of absolute values of the drive voltage of the two successive frames to be no greater than ½ of a maximum drive voltage; wherein the input video signal includes moving images.

* * * * *